United States Patent
Wu et al.

(10) Patent No.: US 9,430,619 B2
(45) Date of Patent: Aug. 30, 2016

(54) MEDIA DECODING CONTROL WITH HARDWARE-PROTECTED DIGITAL RIGHTS MANAGEMENT

(71) Applicant: Microsoft Corporation, Redmond, WA (US)

(72) Inventors: Yongjun Wu, Bellevue, WA (US); Shyam Sadhwani, Bellevue, WA (US); Samuel J. Wenker, Kirkland, WA (US); Brian P. Evans, Allen, TX (US); Hany Farag, Redmond, WA (US); Lucia Darsa, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 14/482,840

(22) Filed: Sep. 10, 2014

(65) Prior Publication Data
US 2016/0070887 A1   Mar. 10, 2016

(51) Int. Cl.
*H04N 7/167* (2011.01)
*H04L 9/32* (2006.01)
(Continued)

(52) U.S. Cl.
CPC .............. *G06F 21/10* (2013.01); *G06F 21/74* (2013.01); *G06F 21/84* (2013.01); *H04N 21/44055* (2013.01); *G06F 2221/0797* (2013.01)

(58) Field of Classification Search
CPC ..... G06F 21/10; G06F 21/105; H04N 5/913; H04N 2005/91307; H04N 7/1675; G11B 20/0086
USPC ............ 380/200–203; 713/176, 189; 726/26; 705/51, 57–59
See application file for complete search history.

(56) References Cited

U.S. PATENT DOCUMENTS 6,985,591 B2   1/2006   Graunke
7,353,402 B2 *  4/2008   Bourne .................... G06F 21/10
                                                   713/180

(Continued)

FOREIGN PATENT DOCUMENTS

EP   1387238   2/2004
EP   2107486   10/2009

OTHER PUBLICATIONS

Microsoft Corporation, "Protected Media Path," downloaded from the World Wide Web on Dec. 15, 2014, 5 pp. (document not dated).

(Continued)

*Primary Examiner* — Hosuk Song
(74) *Attorney, Agent, or Firm* — Sunah Lee; Judy Yee; Micky Minhas

(57) ABSTRACT

Innovations in the area of hardware-protected digital rights management ("DRM") systems are presented. For example, a hardware-protected DRM system includes a trusted layer and untrusted layer. In the untrusted layer, a control module receives source media data that includes encrypted media data. The control module processes metadata about the media data. The metadata, possibly exposed by a module in the trusted layer, is not opaque within the untrusted layer. In the trusted layer, using key data, a module decrypts encrypted media data, which can be the encrypted media data from the source media data or a transcripted version thereof. A module in the trusted layer decodes the decrypted media data. A host decoder in the untrusted layer uses the metadata to manage at least some aspects of the decoding, rendering and display in the trusted layer, without exposure of decrypted media data or key data within the untrusted layer.

27 Claims, 6 Drawing Sheets

(51) Int. Cl.
*G06F 21/10* (2013.01)
*G06F 21/74* (2013.01)
*G06F 21/84* (2013.01)
*H04N 21/4405* (2011.01)

(56) References Cited

U.S. PATENT DOCUMENTS

| | | | |
|---|---|---|---|
| 7,415,439 B2* | 8/2008 | Kontio | G06F 21/10 705/51 |
| 7,665,143 B2 | 2/2010 | Havens et al. | |
| 7,752,674 B2 | 7/2010 | Evans et al. | |
| 7,861,306 B2* | 12/2010 | DeMello | G06F 21/10 380/201 |
| 7,978,848 B2 | 7/2011 | Zhu et al. | |
| 8,280,051 B2 | 10/2012 | Malcolm et al. | |
| 8,336,109 B2* | 12/2012 | Zhang | G06F 21/10 713/161 |
| 8,457,311 B1 | 6/2013 | Schultz et al. | |
| 8,532,290 B2 | 9/2013 | Zollinger et al. | |
| 8,625,788 B2 | 1/2014 | Pendakur et al. | |
| 8,640,261 B2* | 1/2014 | Vivolo | G06F 21/10 709/225 |
| 8,688,991 B1 | 4/2014 | Sunil | |
| 8,724,696 B2 | 5/2014 | Byford et al. | |
| 8,768,078 B2 | 7/2014 | Neubrand | |
| 2003/0154295 A1 | 8/2003 | Mangold | |
| 2004/0139335 A1 | 7/2004 | Diamand et al. | |
| 2005/0078944 A1 | 4/2005 | Risan et al. | |
| 2008/0063196 A1 | 3/2008 | Evans et al. | |
| 2009/0323826 A1 | 12/2009 | Wu et al. | |
| 2010/0172630 A1 | 7/2010 | Chou et al. | |
| 2011/0299680 A1 | 12/2011 | Vembu et al. | |
| 2012/0102307 A1 | 4/2012 | Wong | |
| 2012/0173877 A1 | 7/2012 | Pendakur et al. | |
| 2012/0176546 A1 | 7/2012 | Yoon | |
| 2012/0284804 A1 | 11/2012 | Lindquist et al. | |
| 2013/0202109 A1 | 8/2013 | Ducharme | |
| 2014/0052873 A1 | 2/2014 | Watson et al. | |
| 2014/0075582 A1 | 3/2014 | Hierro et al. | |
| 2014/0208441 A1 | 7/2014 | Rantala | |

OTHER PUBLICATIONS

Sullivan, "Direct X Video Acceleration Specification for H.264/AVC Decoding," 66 pp. (Dec. 2007, updated Dec. 2010).
ARM, "Trust Zone," downloaded from the World Wide Web on Aug. 10, 2014, 11 pp. (document not dated).
Brightcove Inc., "Protecting Your Content using Google Widevine," downloaded from the World Wide Web on Aug. 7, 2014, 5 pp. (document not dated).
Discretix Technologies Ltd., "Hardware Assisted DRM & Link Protection," downloaded from the World Wide Web on Aug. 6, 2014, 5 pp. (document marked 2013).
International Search Report and Written Opinion dated Nov. 30, 2015, from International Patent Application No. PCT/US2015/049254, 10 pp.
Microsoft Corporation, "H.264 Video Types," 3 pp. (document marked Nov. 2012).
Microsoft Corporation, "Protected Media Path," downloaded from the World Wide Web on Dec. 15, 2014, 5 pp.
Sullivan, "DirectX Video Acceleration Specification for H.264/AVC Decoding," 66 pp. (Dec. 2007, updated Dec. 2010).
Wikipedia, "Media Foundation," downloaded from the World Wide Web on Dec. 15, 2014, 6 pp. (document marked "last modified on Nov. 26, 2014").

* cited by examiner

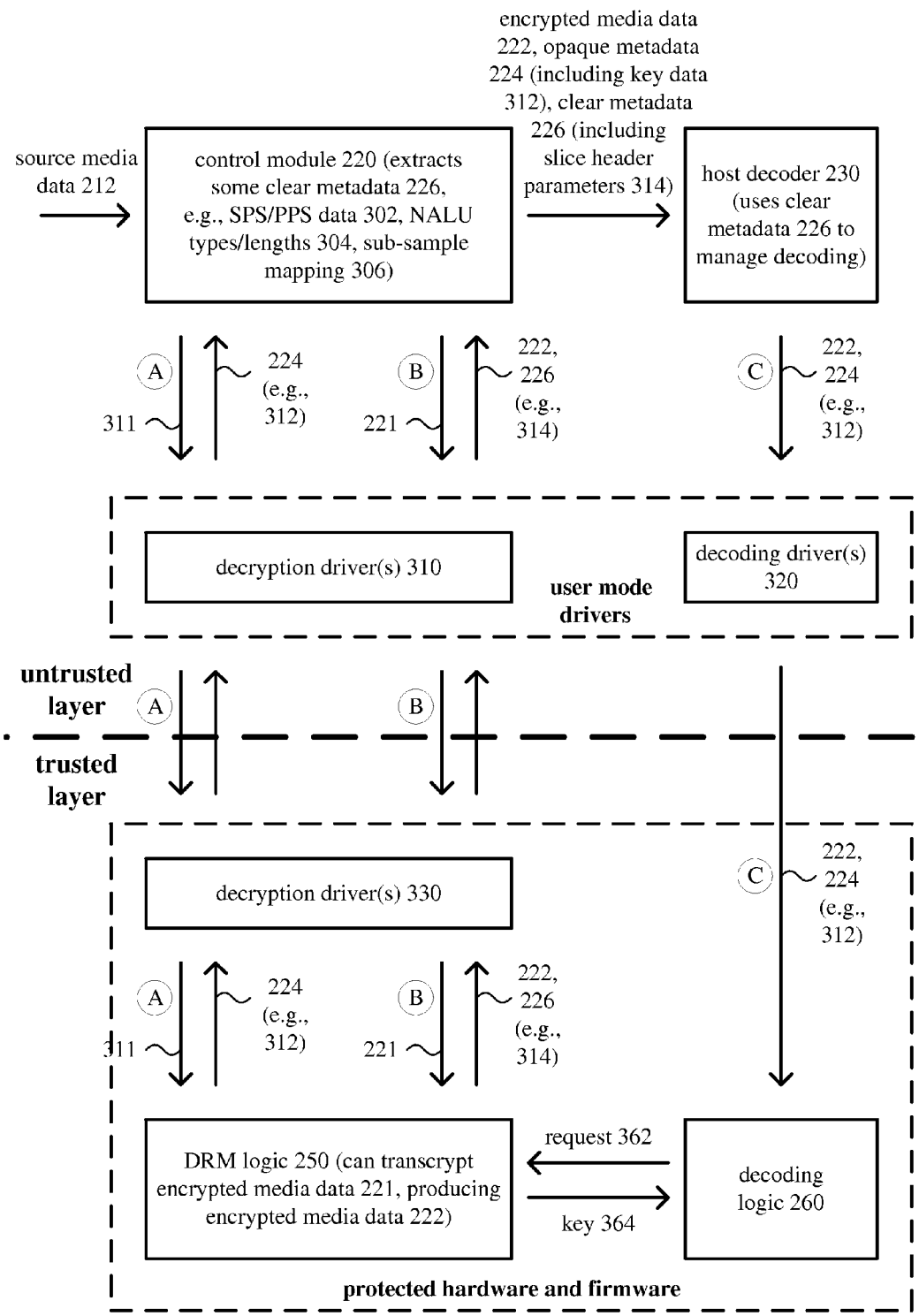

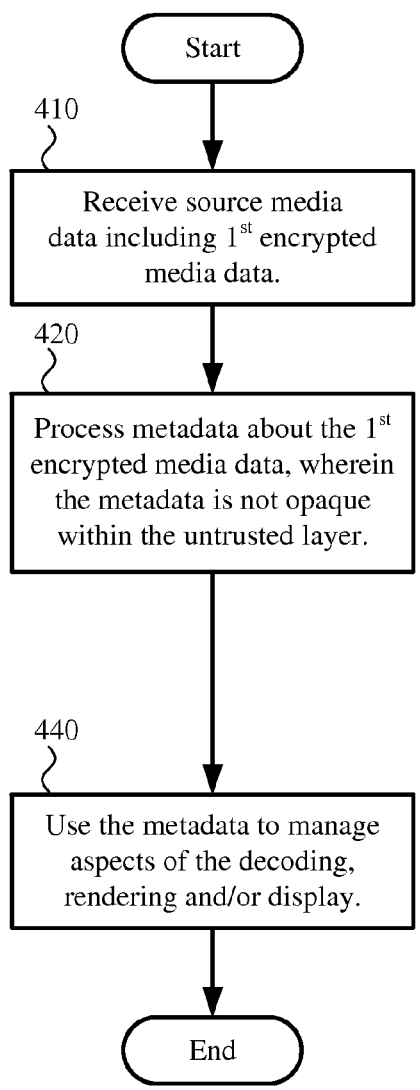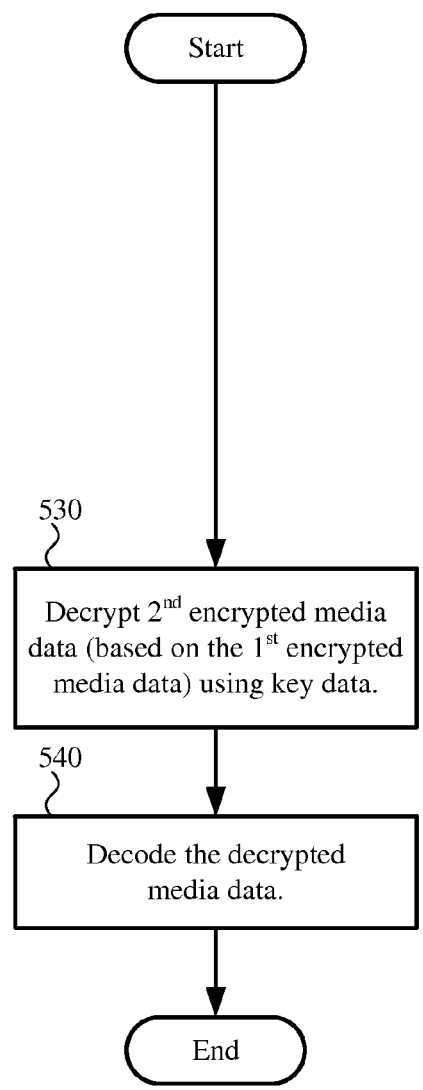

in an untrusted layer of a hardware-protected DRM system in a trusted layer of a hardware-protected DRM system

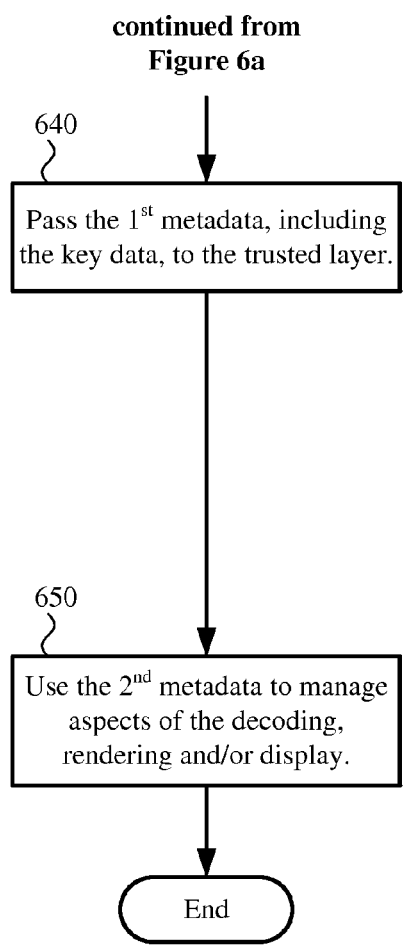
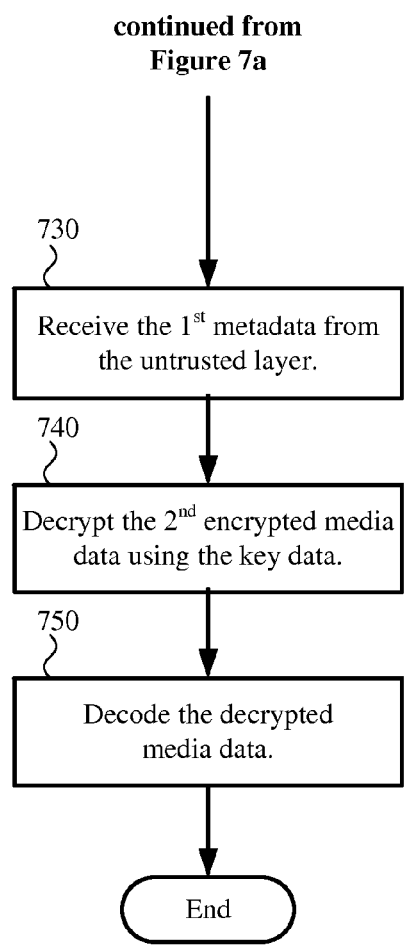

```
typedef struct SliceHeader_tag {
    WORD dSliceHeaderLen;        // indicate the length of the following slice header in byte, it shall not be more than 1024
    BYTE SliceHeaderBytes[0];    // slice header data, the last byte might contain some bits not used, leave them random
} SliceHeader;

typedef struct SliceHeaderSet_tag {
    WORD dNumHeaders;            // indicate the number of slice headers in the input sample
    SliceHeader rgstSliceheader[0];   // cNumHeaders slice header data
} SliceHeaderSet;
```

MEDIA DECODING CONTROL WITH HARDWARE-PROTECTED DIGITAL RIGHTS MANAGEMENT

BACKGROUND

Playback of digital media data has become a common feature on devices such as smartphones, tablet computers, personal computers, gaming consoles, and set-top boxes. As the distribution and playback of digital media data has become more prevalent, various digital rights management ("DRM") systems have been developed to protect media data from unauthorized copying, distribution and playback. Typically, a DRM system uses encryption to protect media data such that only an authorized party can play it back. The authorized party can then use the DRM system to decrypt the media data for playback. Before encryption, the media data may be compressed, or encoded, to reduce the bit rate of the media data. If so, the media data is decompressed, or decoded, after decryption but before playback.

Often, the focus of a DRM system is operations that happen at a playback device, since that is where decrypted media data may be most vulnerable. In some DRM systems, at a playback device, a media source provides encrypted media data to a protected media process (also called a protected media pipeline). The media source is untrusted, but the protected media process is understood to be secure through guarantees provided by an operating system, by obfuscating media playback software, etc. In this architecture, the encrypted media data is "opaque" to the media source. That is, for the media source, due to security provided by encryption, the encrypted media data cannot be understood by an unauthorized party (so long as the encryption is not cracked). On the other hand, following decryption in this architecture, the encrypted media data is no longer opaque—it is accessible at various stages within the protected media process.

While a protected media process provides a level of security against unauthorized access, copying, distribution, playback, etc., it relies on assurances provided by software that has access to the resources of the device. That software may be compromised, however. For example, the software may be hacked or otherwise controlled by a malicious user. In particular, the "clear" media data produced by a decryptor in the protected media process is vulnerable to interception, and keys protected only with software may be susceptible to misuse.

For some types of media data (e.g., low-quality video content, old video content), the assurances provided by a typical software-protected DRM system may be sufficient for the owner or provider of the media data. For other types of media data (e.g., high-quality or high-resolution video content, new releases), such assurances might not provide a sufficient level of confidence to the owner/provider that the media data is secure. For this reason, some owners/providers of media data seek assurances provided by a hardware-protected DRM system. In general, in a hardware-protected DRM system, keys and decrypted media data are protected at the hardware level and/or secure firmware level (a layer below the operating system). The hardware level and secure firmware level are not accessible by software processes. Software such as a media player, media decoder or operating system is untrusted. Thus, the software cannot access the hardware-protected keys and decrypted media data. Instead, keys and media data are available to the untrusted software only in encrypted form, and hence are opaque to the untrusted software. While hardware-protected DRM systems tend to offer better assurances of security than software-protected DRM systems, they can be inflexible. In particular, the flexibility of software-controlled media decoding is lost or hampered in hardware-protected DRM systems.

SUMMARY

In summary, the detailed description presents innovations in the area of hardware-protected digital rights management ("DRM") systems. For example, a hardware-protected DRM system processes source media data, which includes encrypted media data that is to be decrypted. In an untrusted layer of the hardware-protected DRM system, a host decoder uses metadata about the media data to manage aspects of decoding, rendering and/or display of the media data, which happens in a trusted layer of the hardware-protected DRM system. In this way, the host decoder in the untrusted layer can flexibly manage various aspects of the decoding, rendering and/or display in the trusted layer, without exposure of the decrypted media data or key data within the untrusted layer.

According to one aspect the innovations described herein, in an untrusted layer of a hardware-protected DRM system, a control module receives source media data that includes encrypted media data ("first encrypted media data," e.g., one or more encrypted, encoded media samples). The control module processes metadata about the media data. The metadata is not opaque within the untrusted layer, and may be exposed by the control module and/or the trusted layer. A host decoder in the untrusted layer uses the metadata to manage at least some aspects of decoding, rendering and/or display in a trusted layer of the hardware-protected DRM system. The decoding, rendering and display follow decryption in the trusted layer of second encrypted media data, which is based on the first encrypted media data (e.g., the second encrypted media data is the first encrypted media data or a transcrypted version thereof produced in the trusted layer).

According to another aspect of the innovations described herein, a hardware-protected DRM system processes encrypted media data ("first encrypted media data"). In a trusted layer of the hardware-protected DRM system, a module decrypts encrypted media data ("second encrypted media data") using key data. The second encrypted media data can be the first encrypted media data or a transcrypted version thereof. A module in the trusted layer then decodes the decrypted media data. Metadata about the media data is used to manage, from an untrusted layer of the hardware-protected DRM system, at least some aspects of the decoding, rendering and/or display in the trusted layer. The metadata is not opaque within the untrusted layer.

The various innovations described herein can be implemented as part of a method, as part of a computing system adapted to perform the method or as part of tangible computer-readable media having computer-executable instructions for causing a computing system to perform the method. The various innovations can be used in combination or separately. As described herein, a variety of other features and advantages can be incorporated into the innovations. The foregoing and other objects, features, and advantages of the invention will become more apparent from the following detailed description, which proceeds with reference to the accompanying figures.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIGS. 2 and 3 are block diagrams illustrating example architectures for media decoding control with hardware-protected DRM, in which some described embodiments can be implemented.

FIG. 4 is a flowchart illustrating a generalized technique for media decoding control with hardware-protected DRM, from the perspective of an untrusted layer.

FIG. 5 is a flowchart illustrating a generalized technique for media decoding control with hardware-protected DRM, from the perspective of a trusted layer.

FIGS. 6a and 6b are flowcharts illustrating an example technique for media decoding control with hardware-protected DRM, from the perspective of an untrusted layer.

FIGS. 7a and 7b are flowcharts illustrating an example technique for media decoding control with hardware-protected DRM, from the perspective of a trusted layer.

FIG. 8 is a pseudocode listing for a data structure for slice header parameters in some example implementations of video decoding control with hardware-protected DRM.

DETAILED DESCRIPTION

The detailed description presents innovations in the area of hardware-protected digital rights management ("DRM") systems. For example, a hardware-protected DRM system includes a trusted layer and untrusted layer. The hardware-protected DRM system processes source media data, which includes encrypted media data that is to be decrypted. In the untrusted layer, a host decoder uses metadata about the media data to manage aspects of decoding, rendering and/or display of the media data, which happen in the trusted layer. The host decoder can be any software or other functionality in the trusted layer that controls or drives special-purpose decoding hardware or graphics hardware adapted for decoding in the trusted layer. In this way, the host decoder in the untrusted layer can flexibly manage various aspects of the decoding, rendering and/or display in the trusted layer, without exposure of the decrypted media data or key data within the untrusted layer.

In the examples described herein, identical reference numbers in different figures indicate an identical component or module. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts. Different embodiments use one or more of the described innovations. Some of the innovations described herein address one or more of the problems noted in the background. Typically, a given technique/tool does not solve all such problems.

I. Example Computing Systems.

Figure 1:
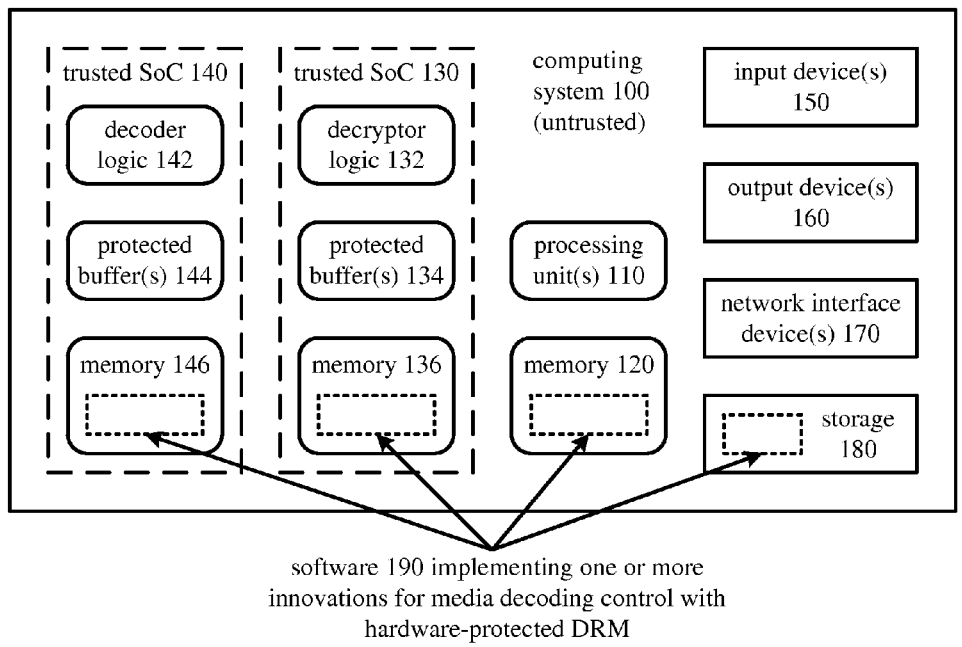
FIG. 1 is a block diagram of an example computing system in which some described embodiments can be implemented.

FIG. 1 illustrates a generalized example of a computing system (100) in which several of the described innovations may be implemented. The computing system (100) is not intended to suggest any limitation as to scope of use or functionality, as the innovations may be implemented in diverse computing systems, including special-purpose computing systems adapted for media decryption and decoding.

With reference to FIG. 1, the computing system (100) includes one or more processing units (110) and memory (120). The processing units (110) execute computer-executable instructions. A processing unit can be a central processing unit ("CPU") or any other type of processor. In a multi-processing system, multiple processing units execute computer-executable instructions to increase processing power. The tangible memory (120) may be volatile memory (e.g., registers, cache, RAM), non-volatile memory (e.g., ROM, EEPROM, flash memory, etc.), or some combination of the two, accessible by the processing unit(s). The memory (120) stores software (190) implementing one or more innovations for media decoding control with hardware-protected DRM (for operations in the untrusted layer), in the form of computer-executable instructions suitable for execution by the processing unit(s).

The computing system (100) also includes trusted systems for media decryption and media decoding. In FIG. 1, a trusted system on a chip ("SoC") (130) includes a combination of hardware and firmware for secure media decryption. The trusted SoC (130) includes decryptor logic (132), one or more protected buffer(s) (134) and memory (136). The decryptor logic (132) can be implemented by an integrated circuit (e.g., an application-specific integrated circuit ("ASIC") such as an ASIC digital signal processor ("DSP"), a graphics processing unit ("GPU"), or a programmable logic device ("PLD") such as a field programmable gate array ("FPGA")), specially designed or configured to implement secure media decryption. The protected buffer(s) (134) can store keys used in decryption (and possibly encryption, for transcrypted media data) as well as clear (decrypted) media data. The memory (136) stores software (190) (here, firmware) implementing one or more innovations for media decoding control with hardware-protected DRM (for operations in the trusted layer).

Another trusted SoC (140) includes decoder logic (142), one or more protected buffer(s) (144) and memory (146). The decoder logic (142) can be implemented by an integrated circuit (e.g., an ASIC such as an ASIC DSP, a GPU, or a PLD such as a FPGA), specially designed or configured to implement secure media decoding. The protected buffer(s) (144) can store decoded media data (that is, media samples). The memory (146) stores software (190) (here, firmware) implementing one or more innovations for media decoding control with hardware-protected DRM (for operations in the untrusted layer).

Alternatively, the trusted SoC (130) for media decryption and trusted SoC (140) for media decoding can be combined as a single SoC. Or, the trusted SoC (130) for media decryption and trusted SoC (140) for media decoding can share certain components (e.g., protected buffer(s) (134/144)). One or more layers of drivers (not shown) in the trusted layer and/or untrusted layer can mediate interactions between the trusted SoC(s) and other components of the computing system (100).

A computing system may have additional features. For example, the computing system (100) includes storage (180), one or more input devices (150), one or more output devices (160), and one or more network interface devices (170). An interconnection mechanism (not shown) such as a bus, controller, or network interconnects the components of the computing system (100). Typically, OS software (not shown) provides an operating environment for other software executing in the computing system (100), and coordinates activities of the components of the computing system (100).

The tangible storage (180) may be removable or non-removable, and includes magnetic disks, magnetic tapes or cassettes, CD-ROMs, DVDs, or any other medium which can be used to store information and which can be accessed within the computing system (100). The storage (180) stores software (190) implementing one or more innovations for media decoding control with hardware-protected DRM (for operations in the untrusted layer), in the form of computer-executable instructions suitable for execution by the processing unit(s).

The input device(s) (150) may be a touch input device such as a keyboard, mouse, pen, or trackball, a voice input device, a scanning device, touchscreen, or another device that provides input to the computing system (100). The output device(s) (160) may be a display, printer, speaker, CD-writer, or another device that provides output from the computing system (100).

The network interface device(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 136, 146), storage (180), and combinations of any of the above.

The innovations can be described in the general context of computer-executable instructions, such as those included in modules, being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

The terms "system" and "device" are used interchangeably herein. Unless the context clearly indicates otherwise, neither term implies any limitation on a type of computing system or device. In general, a computing system or device can be local or distributed, and can include any combination of special-purpose hardware and/or hardware with software implementing the functionality described herein.

For the sake of presentation, the detailed description uses terms like "determine," "pass" and "use" to describe computer operations in a computing system. These terms are high-level abstractions for operations performed by a computer, and should not be confused with acts performed by a human being. The actual computer operations corresponding to these terms vary depending on implementation. For example, the term "pass" indicates any way of conveying data between two components of a computing system, whether the data is passed by value or passed by reference, whether the data is passed using a parameter in a function call, a message, an event, or some other mechanism (e.g., by storing the data in a buffer or memory, and exchanging a pointer, handle, reference, etc. to the buffer/memory), and whether the data is conveyed directly between the two components or passes through one or more intermediate components, which may reformat or otherwise transform the data.

II. Example Architectures for Media Decoding Control with Hardware-Protected DRM.

This section describes example architectures for media decoding control with hardware-protected DRM. In general, in a hardware-protected DRM system, keys and decrypted media data are protected at the hardware level and/or secure firmware level, which are not accessible by software processes. At a high level, a hardware-protected DRM system includes a trusted layer and untrusted layer.

The trusted layer (also called the trusted world, secure layer or secure world) includes functionality assumed to be trusted with media data. In the trusted layer, encryption/decryption keys such as private keys, original content keys for encrypted media data, session keys for transcrypted media data, etc. and clear (decrypted, possible decoded) media data are accessible. For example, for the trusted layer, a hardware-protected DRM system includes one or more integrated circuits adapted for decryption and/or decoding, memory storing firmware instructions for controlling the one or more integrated circuits, and protected buffers for storing decrypted media data, decoded media data (that is, media samples) and keys used for decryption. With this hardware/firmware, the trusted layer provides a secure execution environment in which keys and clear media data can be securely stored. Or, as another example, for the trusted layer, a hardware-protected DRM system uses a general-purpose CPU and memory (without any special-purpose, separate hardware for decryption in the trusted layer), but transitions between the trusted layer and untrusted layer are hardware managed. In this model, only specially signed firmware instructions can be loaded and executed in processing for the trusted layer. More generally, for the trusted layer, a hardware-protected DRM system can use any type of processing unit (including a general-purpose CPU) running in the trusted layer or running in a secure mode. The trusted layer may, but need not, include specialized hardware for decryption or media decoding. Rather, software running on a general-purpose CPU can be used for decryption and/or media decoding, although media decoding can be very computationally intensive.

The untrusted layer (also called the untrusted world, insecure layer, insecure world) includes functionality assumed to be untrusted with media data. The untrusted layer can include user mode components as well as kernel mode components. In the untrusted layer, encryption/decryption keys and clear media data are not accessible (that is, they cannot be physically accessed due to separation or cannot be understood due to encryption). For example, for the untrusted layer, the hardware-protected DRM system includes one or more modules of an operating system and/or applications that interact with the trusted layer across one or more interfaces but cannot access the keys or clear (decrypted) media data in the protected buffers (due to physical separation or due to encryption of the media data). Keys and media data are completely inaccessible within the untrusted layer, or they are only available in encrypted form within the untrusted layer.

Figure 2:
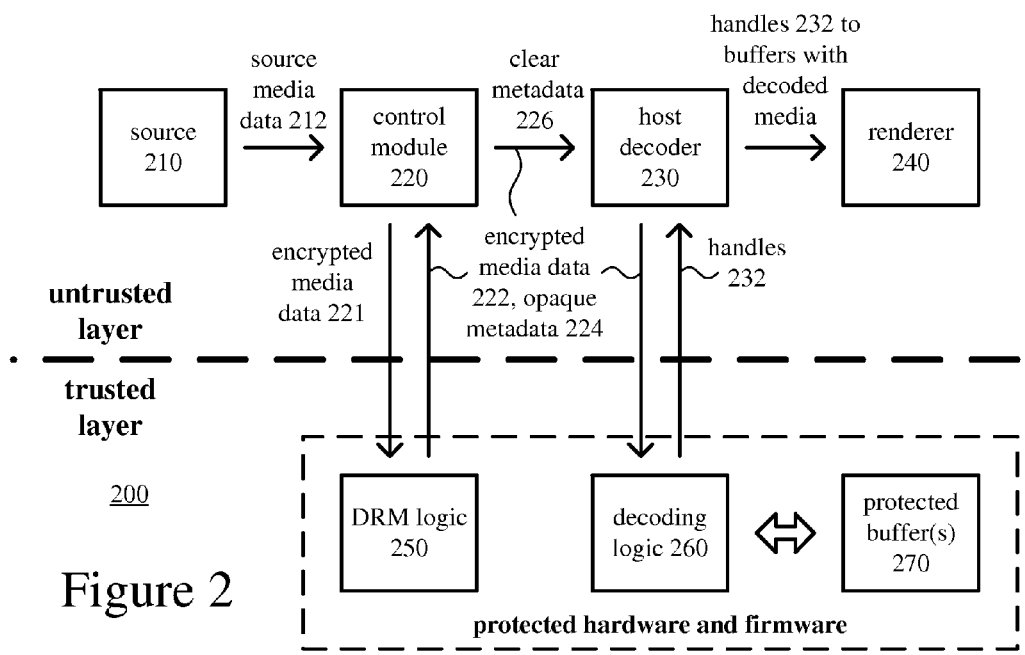

The architecture of a hardware-protected DRM system depends on implementation. FIG. 2 illustrates, at a high level, an example architecture (200) for media decoding control with hardware-protected DRM. The architecture (200) includes an untrusted layer and a trusted layer. In FIG.

2, the trusted layer consists of protected hardware and firmware, including DRM logic (250), decoding logic (260) and one or more protected buffers (270). The untrusted layer includes a source (210), control module (220), host decoder (230) and renderer (240). Various types of metadata pass through the control module (220) of the untrusted layer, including opaque metadata (224) originating in the trusted layer and other, clear metadata (226) (that is, metadata "in the clear," which is not encrypted, and which is accessible and interpretable within the untrusted layer) that may originate in the untrusted layer (and/or the trusted layer). The metadata (224, 226) flows through the untrusted layer, until the host decoder (230) consumes the clear metadata (226) to control aspects of decoding, rendering and/or display, and passes the opaque metadata (224) to the trusted layer.

In the untrusted layer, the source (210) provides source media data (212) to the control module (220). The source (210) can be a demultiplexer or other component that provides source media data (212) from a network connection or storage. The source media data (212) includes encrypted media data (221), e.g., one or more encrypted, encoded media samples. For example, the source media data (212) is an elementary stream such as a video bitstream or an audio bitstream, including data units that are at least partially encrypted. The source media data (212) can also include non-encrypted media data, which may provide at least some of the clear metadata (226). For example, the source media data (212) can include data about an initialization vector used in decryption, a key identifier value that identifies a license/content key for decryption, video decoding parameters, and data unit lengths and types.

The control module (220) receives the source media data (212) from the source (210). In the media processing pipeline, the control module (220) occupies the position normally taken by a decryptor module, but does not perform decryption or handle decrypted media data. Instead, the control module (220) parses or otherwise extracts clear metadata (226) from non-encrypted data in the source media data (212). For example, for the clear metadata (226), the control module (220) parses media decoding parameters (such as a sequence parameter set ("SPS"), picture parameter set ("PPS"), certain slice header parameters, or other parameters for video decoding), information about data units (such as lengths and types of network abstraction layer ("NAL") units) and/or sub-sample mapping data, which indicates non-encrypted amounts and encrypted amounts for the respective data units. The clear metadata (226) can also include supplemental enhancement information ("SEI") messages, which are parsed from the source media data (212).

In the trusted layer in FIG. 2, the DRM logic (250) is implemented with hardware and firmware, providing a hardware-protected, secure execution environment in which the DRM components of the control module (220) can run. The DRM logic (250) determines one or more keys to be used for decryption. For example, the DRM logic (250) gets the key(s) in a secure way from a license server. From the license server, the DRM logic (250) can also get policy data that dictates how to use the key(s), what additional protection measures are to be applied, when the key(s) expire and/or other conditions on use of the key(s). The policy data, which can be signed by the license server, can be enforced in the trusted layer. For example, the policy data can include a policy for (1) a time-based restriction such as an expiration time/date, a rule that content will expire after an $n^{th}$ play (e.g., first play), or a play count limit; (2) output protection such as whether content protection is to be applied on an output link; and/or (3) whether decoded media data can be output to a specific type of output such as an analog output or wireless link.

Different media samples (e.g., video frames) can have different keys or use the same key. (If they have the same key, different media samples can have different initialization vectors used for decryption.) In FIG. 2, the DRM logic (250) passes key data back to the untrusted layer as the opaque metadata (224). The opaque metadata (224) can include other information (such as a handle to a memory location, or policy data) that is accessible only within the trusted layer. Alternatively, key data is not passed back to the untrusted layer, but instead is passed to another component (e.g., decoding logic (260)) within the trusted layer.

As shown in FIG. 2, the control module (220) may also pass the encrypted media data (221) to the trusted layer, and the DRM logic (250) may then receive the encrypted media data (221). Some parameters used in the untrusted layer to control media decoding (such as certain slice header data for video decoding) and other parameters (such as SEI messages) may be encrypted in the source media data (220). In this case, from encrypted media data (221) passed to it, the DRM logic (250) decrypts such parameters and passes them back to the control module (220) as part of the clear metadata (226).

When the encrypted media data (221) is passed to the trusted layer, the DRM logic (250) may also transcrypt the encrypted media data (221). In this case, the DRM logic (250) decrypts the encrypted media data (221) using original content key(s) and re-encrypts the media data using one or more session keys, producing encrypted media data (222). After transcryption, the DRM logic (250) passes the encrypted media data (222) to the control module (220) along with the new session key(s) (in the opaque metadata (224)). In this case, the key data includes the session key(s) used in transcryption of the encrypted media data (221). Alternatively, after transcryption, the DRM logic (250) passes the encrypted media data (222) to a buffer accessible to the decoding logic (260), without passing the encrypted media data (222) to the host decoder (230). Or, without performing transcryption, the DRM logic (250) passes the encrypted media data (221) or decrypted media data to a buffer accessible to the decoding logic (260).

In FIG. 2, in the untrusted layer, the control module (220) passes the opaque metadata (224), the clear metadata (226) and the encrypted media data (222) to the host decoder (230). The encrypted media data (222) passed to the host decoder (230) can be the same as the encrypted media data (221) in the source media data (212) (if transcryption is not used) or different (if transcryption is used). Or (as noted above), the encrypted media data (222) can bypass the host decoder (230) (e.g., because the encrypted media data (222) after transcryption is passed within the trusted layer, or because the encrypted media data (221) or decrypted media data is passed within the trusted layer by the DRM logic (250)).

In some example implementations, the host decoder (230) is a software-based host video decoder. Alternatively, the host decoder (230) is an audio decoder, image decoder or other type of media decoder. In general, the host decoder (230) is software and/or firmware that controls or drives special-purpose decoding hardware or graphics hardware adapted for decoding in the decoding logic (260). Typically, the special-purpose decoding hardware or graphics hardware in the decoding logic (260) performs at least some common, simple, computationally-intensive decoding operations (such as inverse frequency transform operations, interpolation operations, and loop filtering operations), but it can also perform other, more complicated decoding operations (such as entropy decoding). The host decoder (230) performs higher-level operations such as bitstream parsing, which may be algorithmically complex. This split of decoding operations can help keep the decoding hardware/graphics hardware of the decoding logic (260) simple, while moving algorithmic complexity to the host decoder (230). The exact operations performed by the host decoder (230) in the untrusted layer versus the decoding logic (260) in the trusted layer depends on implementation.

In FIG. 2, the host decoder (230) passes the opaque metadata (224) and the encrypted media data (222) to the trusted layer for decryption and decoding. The opaque metadata (224) and the encrypted media data (222) can be passed across a decoding acceleration interface. For example, the decoding acceleration interface can be a DirectX Video Acceleration ("DXVA") interface or other acceleration interface. Alternatively, the host decoder (230) passes only the opaque metadata (224) across the interface (if encrypted media data was not provided to the host decoder (230)), passes only the encrypted media data (222) across the interface (if opaque metadata was not provided to the host decoder (230)), or passes neither opaque metadata nor encrypted media data across the interface.

Concurrent with decoding, the host decoder (230) uses the clear metadata (226) to control various aspects of decoding, rendering and/or display, without consideration of parameters within the encrypted media data, which is opaque to the host decoder (230). For example, the host decoder (230) uses the clear metadata (226) to manage picture buffers and resource utilization during video decoding, while special-purpose video decoding hardware or acceleration hardware in the trusted layer performs most of the actual video decoding operations. The video decoding operations can follow the H.264/AVC standard, the H.265/HEVC standard, the SMPTE 421M (VC-1) standard, a VPx format, or another format or standard. Thus, for example, a software-based host video decoder in the untrusted layer manages various aspects of video decoding through a video decoding acceleration interface, without exposure of decrypted video data to the host decoder (230) or other components in the untrusted layer. Or, a host audio decoder, image decoder or other type of media decoder, through an interface, similarly controls aspects of media decoding, rendering and/or display.

In the trusted layer in FIG. 2, the decoding logic (260) can be implemented with hardware and firmware. In FIG. 2, the decoding logic (260) receives the encrypted media data (222) and opaque metadata (224) from the host decoder (230). Working with the decryption logic (250), the decoding logic (260) determines the key(s) used to decrypt the encrypted media data (222) from the opaque metadata (224) and decrypts the encrypted media data (222). The decoding logic (260) decodes the decrypted but still encoded media data, producing decoded media data (that is, media samples). The decoded media data (e.g., decoded video frames) is stored in the protected buffer(s) (270). Alternatively, the encrypted media data (222) and/or key data is provided by the DRM logic (250), then decrypted and decoded. Or, decrypted media data is provided by the DRM logic (250), then decoded by the decoding logic (260).

In the protected buffer(s) (270), the decoded media data can be accessed by components in the trusted layer. The decoded media data cannot be accessed by the host decoder (230) or other components in the untrusted layer, however (e.g., due to physical separation or re-encryption). For example, from the untrusted layer, the host decoder (230) or another component in the untrusted layer cannot read from the protected buffer(s) (270) or write to the protected buffer(s) (270). Instead, from the untrusted layer, the host decoder (230) or another component in the untrusted layer sends commands to the protected buffer(s) (270). For example, the host decoder (230) can specify operations on the decoded media data (e.g., output of a picture, deletion of a picture, scaling of a picture, rotation of a picture, compositing multiple pictures) using handles (232) to the appropriate buffers with decoded media data. In the untrusted layer, the host decoder (230) passes the handles (232) to a renderer (240), which can similarly specify operations to perform on the decoded media data for output. The host decoder (230) can also make SEI messages in the clear metadata (226) available to a display module (e.g., for captioning text, for framing information).

Although FIG. 2 shows the DRM logic (250), decoding logic (260) and protected buffer(s) (270) as being separate, the DRM logic (250), decoding logic (260) and protected buffer(s) (270) can be part of a single component (e.g., single SoC).

FIG. 3 shows additional details of an example architecture (300) for media decoding control with hardware-protected DRM. Compared to FIG. 2, FIG. 3 shows additional details for the control module (220) and host decoder (230) of the untrusted layer, DRM logic (250) and decoding logic (260) of the trusted layer, and drivers in the untrusted layer and trusted layer. It also shows details specific to decoding control for video. Also, FIG. 3 shows a particular flow of opaque metadata (224) and encrypted media data (221, 222) through the hardware-protected DRM system, which is consistent with transcryption of the media data using session keys.

In FIG. 3, the control module (220) receives source media data (212), which includes encrypted media data (221) as well as non-encrypted media data. In FIG. 3, the source media data (212) includes an elementary video bitstream that includes NAL units. For example, the NAL units are formatted according to the H.264/AVC standard, H.265/HEVC standard, or another standard or format. The NAL units include video decoding parameters, such as SPS data, PPS data and slice header parameters, as well as slice data and supplemental enhancement information ("SEI") messages.

The control module (220) extracts some clear metadata (226) from the source media data (212). In particular, the control module (220) can extract SPS data and/or PPS data (302), NAL unit types and lengths (304) and sub-sample mapping data (306), which indicates non-encrypted amounts and encrypted amounts for the respective NAL units. For example, part of a slice NAL unit (such as the start code, NAL unit header including NAL unit type) may be non-encrypted, while another part of the slice NAL unit (such as the slice data) is encrypted. The sub-sample mapping data (306) for a NAL unit indicates how much of the NAL unit is clear data and how much is encrypted data.

At a high level, interactions between the untrusted layer and trusted layer include three steps, which are shown as steps A, B and C in FIG. 3. In step A, the control module (220) makes a request (311) for key data (312) to the trusted layer. In FIG. 3, the request (311) is conveyed through layers of decryption drivers (310, 330) to DRM logic (250) in the trusted layer. In FIG. 3, the decryption driver(s) (310) in the untrusted layer are user mode drivers, but alternatively one or more of the decryption driver(s) (310) is a kernel mode driver in the untrusted layer. The request (311) also passes through one or more layers of decryption drivers (330) in the trusted layer before reaching the DRM logic (250).

The DRM logic (250) determines one or more keys to be used for decryption and passes the key data (312) back to the untrusted layer as part of the opaque metadata (224). For example, the DRM logic (250) includes key slot management logic to determine the key(s). The key(s) to be used for decryption can be the original content keys (if the encrypted media data (222) is the encrypted media data (221) in the source media data (212)). Or, the key(s) to be used for decryption can be session key(s) (if the encrypted media data (221) is transcrypted to produce the encrypted media data (222)). The key data (312) can be encrypted versions of the key(s) to be used for decryption, a token specifying such key(s), or a handle to a secure location storing such key(s). For example, the key data (312) can be an encrypted version of a session key (used in transcryption), a token that represents such a session key, a handle to a secure location storing such a session key, an encrypted version of an original content key (if transcryption is not used), a token that represents such an original content key, or a handle to a secure location storing such an original content key. The encrypted version of the original content key or session key can be encrypted using a symmetric key shared by different components within the trusted layer, or by a key otherwise shared between the different components within the trusted layer.

In step B, the control module (220) passes at least some of the encrypted media data (221) to the trusted layer. The encrypted media data (221) is conveyed through the decryption driver(s) (310) in the untrusted layer and the decryption driver(s) (330) in the trusted layer to the DRM logic (250) in the trusted layer. In some cases, video decoding parameters (such as certain slice header parameters (314)) that will be part of the clear metadata (226) are encrypted in the source media data (212). The DRM logic (250) can decrypt the encrypted media data (221) in order to extract such video decoding parameters. The DRM logic (250) passes the extracted clear metadata (226) (in FIG. 3, the selected slice header parameters (314)) back to the control module (220). Other parameters such as NAL unit types and lengths (304) can also be encrypted in the source media data (212), and hence extracted by the DRM logic (250). Alternatively, the video decoding parameters can be extracted by a GPU or other decoding hardware under control of the DRM logic (250), then passed back to the control module (220). For example, the video decoding parameters can be extracted by a vendor-specific driver under control of the DRM logic (250).

In the example of FIG. 3, the DRM logic (250) can also transcrypt the encrypted media data (221). If so, the DRM logic (250) decrypts the encoded media data (221) using one or more original content keys (e.g., acquired from a license server) consistent with policy data and re-encrypts the media data using one or more session keys, producing encrypted media data (222). In this case, the key data (312) specifies the session key(s). The DRM logic (250) passes the encrypted media data (222) to the control module (220). Or, the DRM logic (250) passes the encrypted media data (222) to the decoding logic (260), bypassing the control module (220) and host decoding (230) in the untrusted layer. Transcryption can change the amounts of non-encrypted data and encrypted data in the respective NAL units, in which case the control module (220) updates the sub-sample mapping data (306).

In the untrusted layer, the control module (220) passes the opaque metadata (224) and the clear metadata (226) to the host decoder (230). If passed back to it, the control module (220) also passes the encrypted media data (222) to the host decoder (230). For example, the opaque metadata (224) and/or clear metadata (226) are passed as metadata attributes to encrypted, encoded media samples.

In step C, the host decoder (230) passes the opaque metadata (224), including the key data (312), to the trusted layer for use in decryption. The host decoder (230) also passes the encrypted media data (222), if provided to it, to the trusted layer for decryption and decoding. In FIG. 3, the opaque metadata (224) and encrypted media data (222) are conveyed through one or more layers of decoding drivers (320) to decoding logic (260) in the trusted layer. For example, the decoding driver(s) (320) are part of a DXVA interface or other user mode drivers. The opaque metadata (224) and encrypted media data (222) can also pass through one or more layers of drivers (not shown) in the trusted layer before reaching the decoding logic (260). In addition to the key data (312) and other opaque metadata (224), the host decoder (230) can pass other data used during decryption (e.g., initialization vector data, description of the key data (312)) to the decoding logic (260).

The decoding logic (260) receives the opaque metadata (224) and the encrypted media data (222). Working with the decryption logic (250), the decoding logic (260) determines the key(s) used to decrypt the encrypted media data (222) from the key data (312). For example, when the key data (312) is a token, the decoding logic (260) makes a request (362) including the token to the decryptor logic (250). The decryptor logic (250) determines a key (364) (original content key or session key) using the token, and passes the key (364) back to the decoding logic (260). Or, when the key data (312) is an encrypted key, the decoding logic (260) makes a request (362) including the encrypted key to the decryptor logic (250). The decryptor logic (250) decrypts the key (364) and passes the key (364) back to the decoding logic (260). Then, working with the decryptor logic (220), the decoding logic (260) uses the key (364) to decrypt the encrypted media data (222) in a manner consistent with policy data, if present.

The decoding logic (260) decodes the decrypted but still encoded media data, producing decoded media data. Concurrently, in the untrusted layer, the host decoder (230) uses the clear metadata (226) to control various aspects of the decoding, rendering and/or display, without consideration of parameters within the encrypted media data (222), which is opaque to the host decoder (230). For example, the host decoder (230) uses the SPS data and/or PPS data (302), NAL unit types and lengths (304) and certain slice header parameters (314) to manage picture buffers and resource utilization during video decoding.

III. Example Techniques for Media Decoding Control with Hardware-Protected DRM.

FIG. 4 illustrates a generalized technique (400) for media decoding control with hardware-protected DRM, from the perspective of an untrusted layer. FIG. 5 illustrates a corresponding generalized technique (500) for media decoding control with hardware-protected DRM, from the perspective of a trusted layer.

With reference to FIG. 4, in an untrusted layer of a hardware-protected DRM system, a control module receives (410) source media data that includes encrypted media data ("first encrypted media data," e.g., one or more encrypted, encoded media samples). The first encrypted media data is opaque within the untrusted layer.

The control module processes (420) metadata about the media data. The metadata is not opaque within the untrusted layer (that is, such metadata is "in the clear"—not encrypted—and hence accessible and interpretable within the untrusted layer). The control module can parse at least some of the clear metadata from the source media data. The control module can also receive at least some of the clear metadata from a trusted layer of the hardware-protected DRM system. (In this case, the control module can pass at least some of the source media data to the trusted layer, which receives the at least some of the source media data, determines the at least some of the clear metadata, and passes the at least some of the clear metadata to the untrusted layer.) For example, the clear metadata can include media decoding parameters (such as at least some SPS parameters (all SPS parameters, or a subset thereof), at least some PPS parameters (all PPS parameters, or a subset thereof), at least some slice header parameters (all slice header parameters, or a subset thereof), or other parameters for video decoding), information about data units (such as lengths, types) and/or sub-sample mapping data, which indicates non-encrypted amounts and encrypted amounts for the respective data units. Alternatively, the clear metadata can include other types of media decoding parameters, information about data units and/or sub-sample mapping data.

With reference to FIG. 5, in the trusted layer of the hardware-protected DRM system, a module decrypts (530) encrypted media data ("second encrypted media data") using key data. If the key data is an encrypted version of a key (original content key, session key) to be used to decrypt the second encrypted media data, the module decrypts the key before using it. Or, if the key data is a token representing the key to be used to decrypt the second encrypted media data, the module determines the key using the token, and then uses the key for decryption of the second encrypted media data. Or, if the key data is a handle to a secure location storing the key, the module recovers the key from the secure location. The second encrypted media data can be the first encrypted media data (from the source media data) or a transcrypted version thereof (previously generated in the trusted layer, which receives the first encrypted media data from the untrusted layer and transcrypts the first encrypted media data into the second encrypted media data using a session key). A module in the trusted layer then decodes (540) the decrypted media data.

In the trusted layer of the hardware-protected DRM system, a module can receive policy data for the first encrypted media data. For example, the module can initially receive the policy data from a license server that also provides key data for the first encrypted media data, and later receive it as part of opaque metadata (224) or in some other way. The policy data can dictate how to use the key(s), what additional protection measures are to be applied, when the key(s) expire and/or other conditions on use of the key(s). For example, the policy data can include a policy for (1) a time-based restriction such as an expiration time/date, a rule that content will expire after an $n^{th}$ play (e.g., first play), or a play count limit; (2) output protection such as whether content protection is to be applied on an output link; and/or (3) whether decoded media data can be output to a specific type of output such as an analog output or wireless link. The policy data can be signed by the license server, in which case the module verifies the signature. The module then enforces the policy data during decryption.

Returning to FIG. 4, a host decoder in the untrusted layer uses (440) the metadata to manage at least some aspects of the decoding (540), rendering and/or display in the trusted layer.

In some implementations, aside from the clear metadata used by the host decoder, other metadata (e.g., key data, a handle to a shared memory location) is also exchanged between the trusted layer and the untrusted layer, where the other metadata is opaque within the untrusted layer. For example, a module in the trusted layer determines other, opaque metadata that includes key data for decryption of the second encrypted media data, and passes the other, opaque metadata to the untrusted layer. The control module receives the other, opaque metadata from the trusted layer. The control module passes the other, opaque metadata (including the key data) to the host decoder, which passes it to the trusted layer for use in the decryption of the second encrypted media data. A module in the trusted layer receives the other metadata from the untrusted layer and uses it for decryption of the second encrypted media data. Similarly, the other, opaque metadata can include a handle (opaque within the untrusted layer) to a shared memory location in the trusted layer, which can store clear media data or encrypted media data. In this case, the control module receives the opaque handle and passes it to the host decoder, which passes it to the trusted layer for use in decryption and/or decoding. Or, the opaque metadata can include policy data. In other implementations, such other, opaque metadata is not exchanged between the trusted layer and the untrusted layer.

Figure 6A:
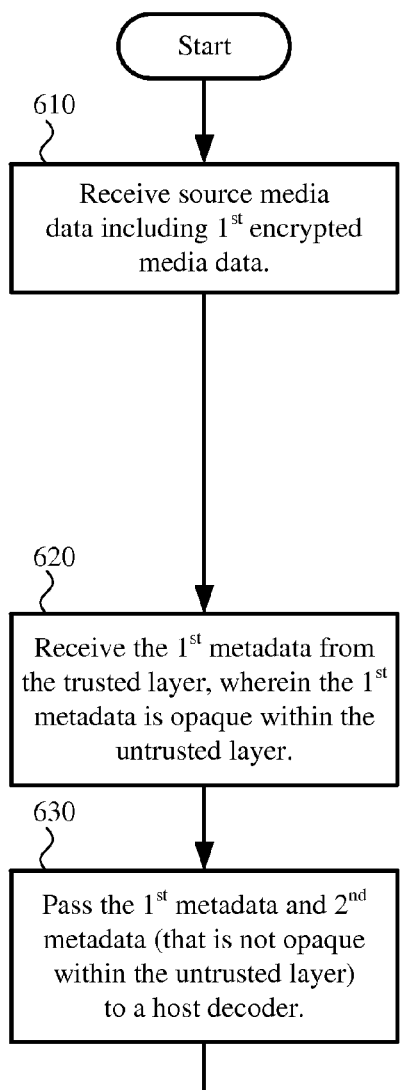
Figure 7A:
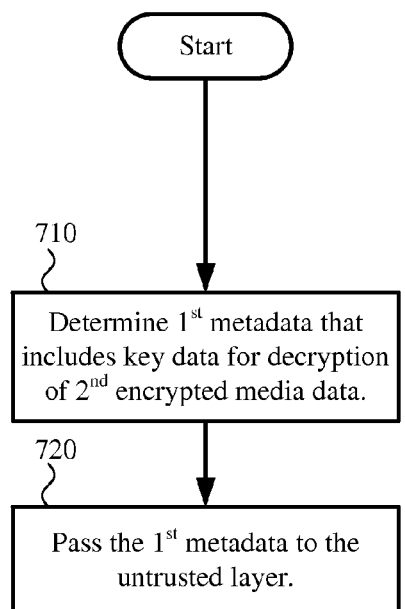

FIGS. 6a and 6b illustrate a more detailed example technique (600) for media decoding control with hardware-protected DRM, from the perspective of an untrusted layer. FIGS. 7a and 7b illustrate a corresponding example technique (700) for media decoding control with hardware-protected DRM, from the perspective of a trusted layer. Compared to FIGS. 4 and 5, FIGS. 6a, 6b, 7a and 7b show a particular flow of opaque metadata within the hardware-protected DRM system, which is consistent with transcryption of the media data using session keys With reference to FIG. 6a, in an untrusted layer of a hardware-protected DRM system, a control module receives (610) source media data that includes encrypted media data ("first encrypted media data," e.g., one or more encrypted, encoded media samples). The first encrypted media data is opaque within the untrusted layer.

With reference to FIG. 7a, in a trusted layer of the hardware-protected DRM system, a module (such as the DRM logic (250) in FIG. 2 or 3) determines (710) metadata ("first metadata") that includes key data to be used for decryption of encrypted media data ("second encrypted media data"). The key data can be, for example, an encrypted version of a key to be used to decrypt the second encrypted media data or a token or handle representing such a key. The second encrypted media data can be the first encrypted media data or a transcrypted version thereof. The first metadata can also include policy data.

The module in the trusted layer passes (720) the first metadata to the untrusted layer of the hardware-protected DRM system. The module in the trusted layer can also pass the second encrypted media data to the untrusted layer. In particular, when the second encrypted media data is a transcrypted version of the first encrypted media data, the module in the trusted layer can receive the first encrypted media data from the untrusted layer, transcrypt the first encrypted media data into the second encrypted media data, and then pass the second encrypted media data to the untrusted layer. Or, the module in the trusted layer can pass the second encrypted media data to another module in the trusted layer for purposes of decryption and decoding.

Returning to FIG. 6a, from the trusted layer of the hardware-protected DRM system, the control module receives (620) the first metadata. As noted, this first metadata includes key data for decryption of the second encrypted media data. The first metadata and the second encrypted media data are opaque within the untrusted layer.

In the untrusted layer, the control module can also process metadata ("second metadata") that is not opaque within the untrusted layer. For example, the control module can parse at least some of the second metadata from the source media data, so long as the second metadata is not encrypted in the source media data. Or, the control module can pass at least some of the source media data to the trusted layer. In this case, a module (e.g., DRM logic) in the trusted layer can receive at least some of the source media data from the untrusted layer, determine at least some of the second metadata from the source media data, and then pass such second metadata to the untrusted layer. The module in the trusted layer then receives some of the second metadata back from the trusted layer. The second metadata can include media decoding parameters (such as at least some of a SPS, at least some of a PPS, at least some slice header parameters, or other parameters for video decoding), information about data units (such as lengths, types) and/or sub-sample mapping data.

With reference to FIG. 6a, the control module passes (630) the first (opaque) metadata and the second (clear) metadata to a host decoder in the untrusted layer. The control module can also pass the second encrypted media data to the host decoder, if the second encrypted media data was passed to the control module in the untrusted layer. With reference to FIG. 6b, the host decoder can pass (640) the first metadata (including the key data) to the trusted layer for use in decryption of the second encrypted media data, consistent with policy data. If provided to it, the host decoder can also pass the second encrypted media data to the trusted layer for decryption using the key data, consistent with policy data, and for decoding of the decrypted media data.

With reference to FIG. 7b, a module in the trusted layer (e.g., decoding logic (260) in FIG. 2 or 3) receives (730) the first metadata (including the key data) from the untrusted layer. The module in the trusted layer also receives (from the host decoder or otherwise) the second encrypted media data. The module in the trusted layer then decrypts (740) the second encrypted media data using the key data. If the key data is an encrypted version of a key (original content key, session key) to be used to decrypt the second encrypted media data, the module decrypts the key before using it. Or, if the key data is a token representing the key to be used to decrypt the second encrypted media data, the module determines the key using the token, and then uses the key for decryption of the second encrypted media data. Or, if the key data is a handle to a secure location storing the key, the module can recover the key from the secure location and then use the key for decryption of the second encrypted media data. The module in the trusted layer can also enforce policy data it receives (from the host decoder as part of the first metadata, or otherwise). The module then decodes (750) the decrypted media data.

In the untrusted layer, the host decoder can use the second metadata to manage pictures and/or resources during the decoding. With reference to FIG. 6b, rather than passing the second metadata to the trusted layer, the host decoder uses (650) the second metadata to manage various aspects of the decoding of the decrypted media data, rendering and/or display.

IV. Example Implementations of Video Decoding Control with Hardware-Protected DRM.

This section describes examples of architectures, metadata and interface calls in some example implementations of video decoding control with hardware-protected DRM.

A. Aspects of Hardware-Level Security.

In some example implementations, a hardware-protected DRM system provides hardware-level security. That is, media data is protected using hardware-based guarantees in the trusted layer of the hardware-protected DRM system. Features of hardware/firmware in the trusted layer are exposed through an interface. Various functions, which implement the interface, connect calls through the interface to the features of the hardware/firmware. The interface implementation and hardware/firmware (together, "DRM hardware/firmware implementation") collectively provide a secure execution environment (also called a trusted execution environment) for hardware-protected DRM.

The hardware-level security is provided through various aspects of the DRM hardware/firmware implementation. For example, private keys, original content keys and session keys do not leave the DRM hardware/firmware implementation in the clear. That is, the keys only leave the DRM hardware/firmware implementation in encrypted form. In the untrusted layer, the encrypted keys are handled as opaque data—only the DRM hardware/firmware implementation understands the format of the keys. Similarly, where applicable, clear (decrypted) media data remains inside the DRM hardware/firmware implementation and is only transferred between components of the DRM hardware/firmware implementation (e.g., for decoding, for rendering). This restriction on media data can apply to some types of media data (e.g., video) but not other types of media data (e.g., audio).

The contents of memory inside the DRM hardware/firmware implementation are not accessible by components of the untrusted layer. More generally, isolation between the trusted layer and untrusted layer is enforced by the DRM hardware/firmware implementation. This isolation can be implemented by using physically separate memory (e.g., memory on different chips) or by using encryption in a hardware-protected manner.

The DRM hardware/firmware implementation can use any of various types of encryption/decryption schemes and keys. For example, the DRM hardware/firmware implementation uses 128-bit AES for symmetric encryption/decryption and uses 256-bit ECC for asymmetric encryption/decryption. The interface of the DRM hardware/firmware implementation may permit new types of encryption/decryption schemes and keys. Thus, the DRM hardware/firmware implementation can support different key sizes and encryption/decryption schemes, so long as appropriate functions for encryption and decryption are added.

In the DRM hardware/firmware implementation, key data can be represented using a "key blob." A key blob is a data structure that contains data for a key to be used for encryption or decryption. Although key blobs may pass between the trusted layer and untrusted layer, a key blob is typically opaque within the untrusted layer.

The DRM hardware/firmware implementation can include one or more integrated circuits adapted for decryption and/or decoding, memory storing firmware instructions for controlling the one or more integrated circuits, and protected buffers for storing decrypted media data, decoded media data and keys used for decryption. Alternatively, for the trusted layer, a hardware-protected DRM system can use a general-purpose CPU and memory without any special-purpose, separate hardware for decryption, but transitions between the trusted layer and untrusted layer are hardware managed, and only specially signed firmware instructions can be loaded into the memory and executed in processing for the trusted layer. For example, the hardware-protected DRM system uses a version of the ARM® TrustZone® technology. More generally, for the trusted layer, a hardware-protected DRM system can use any type of processing unit (including a general-purpose CPU) running in the trusted layer or running in a secure mode. The trusted layer may, but need not, include specialized hardware for decryption or media decoding.

B. Example Architectures.

Within the untrusted layer, a control module (220) can make calls to one or more layers of decryption drivers (310). At least one such driver (310) receives calls from the control module (220) for decryption operations. At least one such driver (310) makes calls to the interface to the trusted layer.

The DRM hardware/firmware implementation exposes the interface between the trusted layer and untrusted layer, independent of the transport mechanism between the two layers. For example, various types of parameters can be passed across the boundary between software running in user mode (in the untrusted layer) and firmware running in the trusted layer, using any appropriate transport mechanism.

For the trusted layer, the DRM hardware/firmware implementation includes several layers of functionality, including an interface implementation layer and a hardware/firmware layer. The interface implementation layer exposes an interface to the untrusted layer. In general, the interface includes various top-level functions for decryption and decoding within the DRM hardware/firmware implementation, as well as top-level functions for policy enforcement. For example, the interface includes functions to (a) allocate/free a context for decryption, (b) initialize device assets such as keys (e.g., signing data, checking device keys), (c) generate a key using local provisioning (acquisition of keys, license certificates and other assets locally) or process a license, (d) decrypt and play back content (including a setup function described below and a pre-processing function described below), and/or (e) perform other operations. The interface implementation implements the top-level functions exposed by the interface.

The top-level functions of the interface can in turn call functions exposed by decryption hardware/firmware or decoding hardware/firmware. The mapping between top-level functions of the interface and functions exposed by the hardware/firmware can be direct (1:1 mapping) or more complicated (e.g., one top-level function calling multiple functions exposed by the hardware/firmware). For example, the decryption hardware/firmware exposes and implements functions (a) to allocate/free a context in the trusted layer, (b) allocate/free memory within the trusted layer, (c) manage a key blob (e.g., allocate, free, transfer ownership of, copy data to), (d) allocate/free/derive a key, (e) wrap/unwrap a key for storage, (f) sign with/verify a digital signature, (g) encrypt/decrypt/transcrypt data, (h) facilitate local provisioning, (i) facilitate remote provisioning (acquisition of keys, license certificates and other assets using a remote server), and/or (j) perform other operations.

C. Example Metadata Attributes.

In some example implementations of the architecture (300) of FIG. 3, the following metadata attributes may be attached to an encrypted video frame that is passed from the control module (220) to the host decoder (230).

A first attribute ("KeyInfoID attribute") is a globally unique identifier ("GUID") that applies for a video frame. It is an example of clear metadata (226). The GUID indicates an identifier (e.g., key identifier, license identifier, content key/policy pair) for the hardware-protected DRM to be used for the video frame. The control module (220) originates the GUID for the KeyInfoID attribute. The host decoder (230) can extract the KeyInfoID attribute and provide it to the decoding driver(s) (320) (e.g., as part of a data structure passed when a function is called to begin decryption and decoding of the video frame), which convey the KeyInfoID attribute to the trusted layer.

A second attribute ("KeyInfo attribute") includes key data (312) that applies for a video frame. It is an example of opaque metadata (224). The KeyInfo attribute includes details about the key slot, key identifier, encrypted key, etc. for the hardware-protected DRM to be used for the video frame. The control module (220) sets the KeyInfo attribute for an encrypted video frame using opaque data provided by the trusted layer. For example, the KeyInfo attribute can be set to include an implementation-specific key data blob that is returned from a call to the setup function, as described below. The host decoder (230) can extract the KeyInfo attribute and provide it to the decoding driver(s) (320) (e.g., as part of a data structure passed when a function is called to begin decryption and decoding of the video frame), which conveys the KeyInfo attribute to the trusted layer.

A third attribute ("VideoDecryptor attribute") is an interface pointer that applies for a video frame. It is an example of the clear metadata (226). It associates the video frame with context information used to decrypt/decode the frame when using hardware-protected DRM. The control module (220) originates and sets the VideoDecryptor attribute. The host decoder (230) can extract the VideoDecryptor attribute and use it determine context information during video frame submission, providing the context information to the decoding driver(s) (320) (e.g., as part of a data structure passed when a function is called to begin decryption and decoding of the video frame).

A fourth attribute ("SubSample_Mapping attribute") includes sub-sample mapping data (306). For example, the sub-sample mapping data (306) includes an array of byte range values that apply for NAL units of a video frame, where every two byte range values makes a pair. The byte range values can be DWORDs (32-bit values) or some other type of value. The first value in a pair indicates the number of clear bytes in a NAL unit, and the second value in the pair indicates the number of encrypted bytes in the NAL unit. Either value of a pair can be zero, but both values are never zero for a pair in typical scenarios (encoding a pair with two zero values may be possible, but would be wasteful). Thus, the array of byte values for the SubSample_Mapping attribute indicates which ranges of bytes to decrypt and which ranges of bytes not to decrypt in the source media data (212), including the possibility that an entire NAL unit is decrypted, an entire NAL unit is not decrypted, or a NAL unit is partially decrypted. Alternatively, a different data structure for the SubSample_Mapping attribute stores values indicating clear regions and encrypted regions for the respective data units. The SubSample_Mapping attribute is an example of clear metadata (226). The control module (220) sets the SubSample_Mapping attribute, potentially based on values parsed from the source media data (212) by the control module (220). If the encrypted media data (222) has been transcrypted, however, the values of the byte ranges may have changed. In this case, the control module (220) can update the values of the SubSample_Mapping attribute accordingly. The host decoder (230) can extract the SubSample_Mapping attribute and pass the byte range values to the decoding driver(s) (320) (e.g., as part of a data structure passed when a function is called to pass the encrypted media data (222)).

A fifth attribute ("ClearSliceHeaderData attribute") includes selected slice header parameters (314) that apply for a video frame. It is an example of clear metadata (226). The control module (220) sets the ClearSliceHeaderData attribute. If the selected slice header parameters (314) are not encrypted in the source media data (212), the control module (220) can parse (and verify) the selected slice header parameters (314) from the source media data (212). Otherwise, one or more components in the trusted layer can parse (and verify) the selected slice header parameters (314) from the encrypted media data (221), possibly using a vender-specific driver to parse (and verify) the selected slice header parameters (314), and return the selected slice header parameters (314) to the control module (220). For example, the ClearSliceHeaderData attribute includes the combination of selected slice header parameters (314) shown in the listing (800) of FIG. 8. In FIG. 8, the SliceHeader structure includes a length dSliceHeaderLen of the slice header (in bytes), followed by dSliceHeaderLen bytes of slice header data. A set of slice header tags is serialized consecutively in a SliceHeaderSet structure. The host decoder (230) can extract the selected slice header parameters (314) from the ClearSliceHeaderData attribute and use the selected slice header parameters (314) to control aspects of decoding (e.g., picture buffer management, resource management).

A sixth attribute ("NALULengthInfo attribute") includes data indicating the lengths of NAL units in the source media data (212) for a video frame. A seventh attribute ("NALUTypes attribute") includes data indicating the types of the NAL units for the video frame. These attributes are examples of clear metadata (226). The control module (220) sets the NALULengthInfo attribute and NALUTypes attribute. If the NAL unit types/lengths (304) are not encrypted in the source media data (212), the control module (220) can parse (and verify) the NAL unit types/lengths (304) from the source media data (212) (e.g., during frame scanning) Otherwise, one or more components in the trusted layer can parse (and verify) the NAL unit types/lengths (304) from the encrypted media data (221), possibly using a vender-specific driver to parse (and verify) the NAL unit types/lengths (304), and return the NAL unit types/lengths (304) to the control module (220). The host decoder (230) can extract values from the NALULengthInfo attribute and the NALUTypes attribute and use the extracted values to control aspects of decoding (e.g., picture buffer management, resource management).

The NAL unit length for a NAL unit accounts for the start code (if any) and NAL unit type for the NAL unit. The NALULengthInfo attribute can include a DWORD per NAL unit in a video frame. For example, for five NAL units for a video frame (including an auxiliary unit delimiter (9 bytes), SPS (25 bytes), PPS (10 bytes), first slice data (50K) and second slice data (60K), the NALULengthInfo attribute includes five DWORDS with values 9, 25, 10, 50K and 60K. The NALUTypes attribute includes the NAL unit type bytes for the respective NAL units of the video frame. For H.264/AVC video, one NAL unit type is one byte, including the syntax elements forbidden_zero_bit, nal_ref_idc, and nal_unit_type.

An eighth attribute ("SPSPPSData attribute") includes SPS data and/or PPS data (302) for NAL units in a video frame. The SPS data and/or PPS data (302) are represented in the SPSPPSData attribute in the same order they appear in the source media data (212). The format is a four-byte (DWORD) length, followed by SPS or PPS data, for each SPS NAL unit or PPS NAL unit. For example, the layout can be the value 10 in a DWORD, 10 bytes of data for an SPS, the value 5 in a DWORD, and 5 bytes of data for a PPS, for a total of 4+10+4+5=23 bytes. The SPSPPSData attribute is an example of clear metadata (226). The control module (220) sets the SPSPPSData attribute. If the SPS/PPS data (302) is not encrypted in the source media data (212), the control module (220) can parse (and verify) the SPS/PPS data (302) from the source media data (212) (e.g., during frame scanning) Otherwise, one or more components in the trusted layer can parse (and verify) the SPS/PPS data (302) from the encrypted media data (221), possibly using a vender-specific driver to parse (and verify) the SPS/PPS data (302), and return the SPS/PPS data (302) to the control module (220). The host decoder (230) can extract SPS/PPS data (302) from the SPSPPSData attribute and use the extracted values to control aspects of decoding (e.g., picture buffer management, resource management).

A ninth attribute ("SampleID attribute") includes data used during decryption of a video frame (e.g., an initialization vector) when using hardware-protected DRM. It is an example of clear metadata (226), but may be passed to the decoding logic (260) (and to the DRM logic (250)) for use in decryption. The control module (220) sets the SampleID attribute for a video frame, potentially based on a value parsed from the source media data (212) by the control module (220). The initialization vector can be provided as a syntax element of a container format, for example. If the encrypted media data (222) has been transcrypted, however, the value for the SampleID attribute may have changed. In this case, the control module (220) can update the value of the SampleID attribute accordingly. The host decoder (230) can extract the SampleID attribute and pass the extracted value to the decoding driver(s) (320) (e.g., as part of a data structure passed when a function is called to pass the encrypted media data (222)).

The host decoder (230) does not consider the encrypted media data (222) when controlling aspects of decoding of a video frame, since the encrypted media data (222) is opaque within the untrusted layer. The host decoder (230) can, however, consider the following four metadata attributes— the SPSPPSData attribute (if present for the video frame) with SPS/PPS data (302) used for slice header parsing, the ClearSliceHeaderData with slice header parameters (314), and the NALUTypes and NALULengthInfo attributes to find and locate slice NAL units.

D. Example Function Calls.

In some example implementations of the architecture (300) of FIG. 3, the following functions may be called when decrypting and decoding encrypted video data.

1. Step A—Creation of Key Data.

When the control module (220) encounters new encrypted media data (221), the control module (220) can prepare a key slot for use with a new key (see, e.g., step A in FIG. 3). For example, the control module (220) calls a function of one of the decryption driver(s) (310) to initialize a hardware key (example of request (311) for key data (312)). The function call filters down to the secure execution environment provided by the decryption driver(s) (330) and DRM logic (250) in the trusted layer, reaching a call to a "setup" function implemented in one of the decryption driver(s) (330).

The setup function accepts a license chain which can decrypt content with a decryption scheme and which is bound to a given license key blob. The function returns sufficient data (including the key data (312)) for content decryption to occur. Various input arguments can provide content key data, license data, policy data and implementation-specific data (private data) that may be used when creating the key data (312). An input/output argument can provide a trusted execution environment context. The setup function can accept as input an argument that specifies the mode requested by the caller for decryption. The setup function can provide as output an argument that specifies the mode to be used for decryption. An output argument can provide a content decryption key blob for a key used in some cases to decrypt (for playback) content with an appropriate key identifier. Another output argument can provide an implementation-specific key data blob (example of key data (312)) used for offloaded decryption. The implementation-specific key data blob is opaque within the untrusted layer of the hardware-protected DRM system.

Overall, the setup function parses and verifies the signatures on various input arguments, validates checksums, validates dates for licenses (if the hardware-protected DRM includes a clock), validates security levels, and verifies that the requested decryption mode is supported. The setup function parses additional data from licenses to build the content decryption key, builds and signs the content decryption key, and returns the content decryption key and mode used. The setup function also builds the implementation-specific key data blob (example of key data (312)) and returns it.

The control module (220) receives the implementation-specific key data blob output from the setup function. The control module (220) attaches the implementation-specific key data blob as the KeyInfo attribute (see above) on each encrypted video frame tied to a given content key/policy. Depending on implementation, the implementation-specific key data blob can be an original content key to be used to decrypt encrypted media data (221) in the source media data (212), a session key to be used to decrypt a transcrypted version thereof, or a token or handle representing one of those keys.

2. Step B—Extraction of Metadata, Transcryption.

When the control module (220) passes encrypted media data (221) to the trusted layer, the control module (220) can request extraction of the selected slice header parameters (314) (and possibly other parameters to be included in the clear metadata (226)) and/or transcryption. For example, a call from the control module (220) to the secure execution environment reaches a call to a "pre-processing" function implemented in one of the decryption driver(s) (330). In the pre-processing function, selected slice header parameters (314) are parsed from a partially or completely encrypted frame, and the encrypted media data (221) may be transcrypted. In general, the values returned as output from the pre-processing function are incorporated into a video frame or metadata attributes of the video frame, which can be passed by the control module (220) to the host decoder (230).

For the pre-processing function, input arguments can provide a content decryption key blob and implementation-specific key data blob (example of key data (312)), respectively, returned by the setup function. An input/output argument can provide a trusted execution environment context. The pre-processing function can accept as input an argument that indicates an initialization vector used for decryption, and return an argument that includes an updated value for the initialization vector (after transcryption) or the initial value for the initialization vector (otherwise). The pre-processing function can also accept as input an argument that includes sub-sample mapping data (306), and return an argument that includes new or modified sub-sample mapping data (306) (if the content was transcrypted) or the original sub-sample mapping data (306) (otherwise). The pre-processing function can accept as input the encrypted bytes to be decrypted, which can be all of the encrypted media data (221) or just part of the encrypted media data (221). (For extraction of the slice header parameters (314), the initial parts of slice NAL units identified in the untrusted layer using NAL unit types and start codes can be passed, along with sub-sample mapping data.) As output, the pre-processing function can return the transcrypted bytes (if the content was transcrypted) or original values (otherwise). An output argument can include slice header parameters (314) extracted from the encrypted media data (221). Another output argument can include opaque frame data used during encryption and decryption (if any) or an empty placeholder.

Overall, in the pre-processing function, one of the decryption driver(s) (330), by itself or working with the DRM logic (250), parses and verifies the signatures on various input arguments, decrypts the received encrypted media data (221) using the given sub-sample mapping data (306) and initialization vector into clear media data in a protected buffer, and parses the encoded video frame to locate slice header(s) and extract the selected slice header parameters (314). Under control of one of the decryption driver(s) (330) or the DRM logic (250), a GPU or other decoding hardware can be used to locate the slice header(s) and extract the slice header parameters (314). The decryption driver (330) and/or DRM logic (250) transcrypts the media data, if transcryption is specified, and returns the encrypted (transcrypted) media data (222) as well as the modified sub-sample mapping data (306). The pre-processing function also returns any updated opaque metadata and (in the clear) the selected slice header parameters (314).

For example, to extract the selected slice header parameters (314) for a slice header of a slice NAL unit formatted according to the H.264/AVC standard, the decryption driver (330) and/or DRM logic (250) removes any emulation prevention byte (0x03 byte in a defined pattern of bytes), removes leading bits for the first_mb_in_slice syntax element, removes bits for syntax elements from the direct_spatial_mv_pred flag element to the end of the pred_weight_table( ) structure, and removes bits for syntax elements in the slice header after the cabac_init_idc syntax element. The remaining syntax elements—including slice type, PPS identifier, frame number, IDR picture identifier, picture order count information, and the dec_ref_pic_marking( ) structure—may be useful for managing aspects of decoding and typically consume few bytes per slice header. In the example of FIG. 8, the extracted, selected slice header parameters (314) are stored in the field SliceHeaderBytes of a Slice-Header structure. Alternatively, the decryption driver (330) and/or DRM logic (250) can extract and return, as the slice header parameters (314), some other subset of the slice header of a slice NAL unit.

3. Step C—Video Decoding Control.

The host decoder (230) is unable to interpret key data (312), other opaque metadata (224) and encrypted media data (222). Instead, the host decoder (230) uses the clear metadata (226) to manage various aspects of decoding, rendering and/or display. In general, the host decoder (230) can extract decryption parameters (possibly opaque) from metadata attributes and convey at least some of the decryption parameters (including opaque parameters) to the decoding driver(s) (320). The host decoder (230), or one of the decoding driver(s) (320), can create a decryption session, populate a data structure to include a reference to the decryption session and the decryption parameters, and pass the data structure to the trusted layer.

The host decoder (230) also extracts video decoding parameters from the metadata attributes and uses the video decoding parameters to control output of a picture from a decoded picture buffer, deletion of a picture from the decoded picture buffer and/or other aspects of decoding, rendering and/or display.

E. Examples Showing Flow of Media Data and Key Data in Different Implementations.

In different example implementations, the flow of media data and key data through the hardware-protected DRM system can be different.

In a first set of approaches, the hardware-protected DRM system includes secure shared memory. Components within the trusted layer (e.g., DRM logic (250), a GPU or other decoding hardware for the decoding logic (260)) can directly access the secure shared memory. Components within the untrusted layer (e.g., control module (220), host decoder (230)) cannot directly access the secure shared memory. After decryption of the encrypted media data (221, 222) in the trusted layer, the clear (decrypted) media data can be stored in the secure shared memory (accessible to the GPU/decoding hardware) in clear form.

Specifically, the control module (220) passes the encrypted media data (221) to the trusted layer. In the trusted layer, the encrypted media data (221) are decrypted with an original content key, which is clear within the trusted layer. Selected slice header parameters (314) are extracted and added to a structure, which is returned as part of clear metadata (226). The clear (decrypted) media data are passed to the secure shared memory, for decoding by the GPU or other decoding hardware. The selected slice header parameters (314) and other clear metadata (226) can be used in the untrusted layer to control aspects of the decoding, rendering and/or display.

For example, the secure shared memory is natively known to components within the trusted layer (including the DRM logic (250) and decoding logic (260)). The native secure shared memory can be a fixed, global BIOS-allocated buffer that has been allocated to stored clear media data, or it can be some other type of secure shared memory (e.g., special RAM— or SRAM—that is physically located on a die). In this case, the clear media data is directly copied into the secure shared memory.

Or, as another example, the secure shared memory is allocated by a component in the trusted layer (e.g., the DRM logic (250) or one of the decryption driver(s) (330)). The component can allocate space inside memory for a GPU or other decoding hardware, then copy the clear media data to the allocated space. The component can then pass an opaque handle to the untrusted layer (e.g., as part of the opaque metadata (224)), which is passed back to the trusted layer (e.g., from the host decoder (230)).

Or, as another example, the secure shared memory is allocated by a component in the untrusted layer. The component in the untrusted layer can allocate space inside memory for a GPU or other decoding hardware, receive an opaque handle to the allocated space, and pass the opaque handle back to a component in the trusted layer (e.g., the DRM logic (250) or one of the decryption driver(s) (330)). The component in the trusted layer can copy the clear media data to the allocated space referenced by the handle. (Before copying the clear media data, the component in the trusted layer can verify that the allocated space is actually secure.) The component in the untrusted layer then passes the opaque handle to the GPU or other decoding hardware for the decoding logic (260).

In a second set of approaches, the hardware-protected DRM system lacks secure shared memory. After decryption of the encrypted media data (221, 222) in the trusted layer, the clear (decrypted) media data are re-encrypted using one or more session keys and passed to the GPU/decoding hardware in encrypted (here, transcrypted) form.

Specifically, the control module (220) passes the encrypted media data (221) to the trusted layer. In the trusted layer, the encrypted media data (221) are decrypted with an original content key, which is clear within the trusted layer. Selected slice header parameters (314) are extracted and added to a structure, which is returned as part of clear metadata (226). A session key (for transcryption) is determined between the DRM logic (250) and decoding logic (260). The session key may be pre-established or established during a decryption session (and exchanged as key data (312)). The clear media data is re-encrypted using the session key (for transcryption). If non-secure shared memory exists, the transcrypted media data are passed to the non-secure shared memory, for decryption using the session key and decoding by the GPU or other decoding hardware. The selected slice header parameters (314) and other clear metadata can be used in the untrusted layer to control aspects of the decoding, rendering and/or display.

For example, the non-secure shared memory is natively known to components within the trusted layer. The native non-secure shared memory can be a fixed, global BIOS-allocated buffer that has been allocated to store transcrypted media data, or it can be some other type of non-secure shared memory. In this case, the transcrypted media data is directly copied into the non-secure shared memory.

Or, as another example, the non-secure shared memory is allocated by a component in the trusted layer (e.g., the DRM logic (250) or one of the decryption driver(s) (330)). The component can allocate space inside memory for a GPU or other decoding hardware, then copy the transcrypted media data to the allocated space. The component can then pass an opaque handle to the untrusted layer (e.g., as part of the opaque metadata (224)), which is passed back to the trusted layer (e.g., from the host decoder (230)).

Or, as another example, the non-secure shared memory is allocated by a component in the untrusted layer. The component in the untrusted layer can allocate space inside memory for a GPU or other decoding hardware, receive an opaque handle to the allocated space, and pass the opaque handle back to a component in the trusted layer (e.g., the DRM logic (250) or one of the decryption driver(s) (330)). The component in the trusted layer can copy the transcrypted media data to the allocated space referenced by the handle. The component in the untrusted layer then passes the opaque handle to the GPU or other decoding hardware for the decoding logic (260).

Otherwise (non-secure shared memory does not exist), the transcrypted media data are passed to the untrusted layer (e.g., to the control module (220)) and then passed back to the trusted layer (e.g., by the host decoder (230)).

In a third set of approaches, the hardware-protected DRM system includes secure shared memory accessible to the GPU or other decoding hardware (as in the first set of approaches), but an original content key (instead of clear media data) is passed via the secure shared memory using one of the transfer mechanisms described in the first set of approaches (e.g., native secure shared memory, allocation of secure shared memory by a trusted component, or allocation of secure shared memory by an untrusted component). The encrypted media data (221) in the source media data (212) is passed to the host decoder (230), which passes it to the trusted layer (to the GPU or other decoding hardware) for decryption using the original content key. In this case, the GPU or other decoding hardware can perform the decryption of the encrypted media data (221) using the original content key. Clear metadata (226) is still used in the untrusted layer to control aspects of the decoding, rendering and/or display.

In a fourth set of approaches, the hardware-protected DRM system lacks secure shared memory accessible to the GPU or other decoding hardware (as in the second set of approaches), but an encrypted original content key (instead of transcrypted media data) is conveyed using one of the mechanisms described in the second set of approaches (e.g., native non-secure shared memory, allocation of non-secure shared memory by a trusted component, allocation of non-secure shared memory by an untrusted component, or passing to/from the untrusted layer). The encrypted media data (221) in the source media data (212) is passed to the host decoder (230), which passes it to the trusted layer (to the GPU or other decoding hardware) for decryption using the original content key. In this case, the GPU or other decoding hardware can perform the decryption of the encrypted media data (221) using the original content key, after decryption of the original content key. Clear metadata (226) is still used in the untrusted layer to control aspects of the decoding, rendering and/or display.

V. Innovative Features.

In addition to the claims presented below, innovative features described herein include but are not limited to the following.

| # | Feature |
|---|---|
| A1 | A computing system comprising, in an untrusted layer of a hardware-protected digital rights management ("DRM") system: means for receiving source media data including first encrypted media data; means for processing metadata about the media data, wherein the metadata is not opaque within the untrusted layer; and means for with a host decoder in the untrusted layer, using the metadata to manage at least some aspects of decoding, rendering and/or display in a trusted layer of the hardware-protected DRM system, wherein the decoding, the rendering and the display follows decryption in the trusted layer of second encrypted media data based on the first encrypted media. |
| B1 | A computing system comprising, in a trusted layer of a hardware-protected digital rights management ("DRM") system: means for decrypting second encrypted media data using key data, wherein the second encrypted media data is based on first encrypted media data; and means for decoding the decrypted media data, wherein metadata about the media data is used to manage, from an untrusted layer of the hardware-protected DRM system, at least some aspects of the decoding, rendering and/or display and wherein the metadata is not opaque within the untrusted layer. |
| C1 | A method comprising, in an untrusted layer of a hardware-protected digital rights management ("DRM") system: receiving source media data including first encrypted media data; receiving first metadata from a trusted layer of the hardware-protected DRM system, the first metadata including key data for decryption of second encrypted media data, wherein the first metadata is opaque within the untrusted layer; and passing the (a) first metadata and (b) second metadata that is not opaque within the untrusted layer to a host decoder in the untrusted layer. |
| C2 | The method of C1 wherein the hardware-protected DRM system includes: for the trusted layer, (a) one or more integrated circuits adapted for decryption and/or decoding, (b) memory storing firmware instructions for controlling the one or more integrated circuits, and (c) protected buffers for storing decrypted media data; and for the untrusted layer, one or more modules of an operating system and/or applications that interact with the trusted layer across one or more interfaces but cannot access the decrypted media data in the protected buffers. |
| C3 | The method of C1 wherein, for the trusted layer, the hardware-protected DRM system uses a general-purpose CPU and memory without special-purpose for decryption, wherein transitions between the trusted layer and the untrusted layer are hardware managed, and wherein only signed firmware instructions can be loaded into the memory and executed in processing for the trusted layer. |
| C4 | The method of C1 wherein the first encrypted media data include one or more encrypted, encoded media samples. |
| C5 | The method of C1 wherein the method further comprises, in the untrusted layer, parsing at least some of the second metadata from the source media data, the second metadata including one of more of: (a) at least some of a sequence parameter set, (b) at least some of a picture parameter set unit, (c) lengths of data units, (d) types of the data units, (e) at least some slice header parameters for at least some of the data units, (f) other parameters to be used for decoding, and (g) sub-sample mapping data for the data units, the sub-sample mapping data indicating non-encrypted amounts and encrypted amounts for the respective data units. |

| # | Feature |
|---|---|
| C6 | The method of C1, wherein the method further comprises, in the untrusted layer: passing at least some of the source media data to the trusted layer; and receiving at least some of the second metadata from the trusted layer, the second metadata including at least some slice header parameters for at least some data units. |
| C7 | The method of C1 wherein the second encrypted media data is the first encrypted media data. |
| C8 | The method of C1 wherein the second encrypted media data is a transcrypted version of the first encrypted media data, the transcrypted version having been created in the trusted layer using the first encrypted media data. |
| C9 | The method of C1 wherein the key data is (a) an encrypted version of a key usable to decrypt the second encrypted media data, or (b) a token or handle representing the key usable to decrypt the second encrypted media data. |
| C10 | The method of C1 wherein the method further comprises, with the host decoder: passing the first metadata, including the key data, to the trusted layer for use in decryption of the second encrypted media data; and using the second metadata to manage at least some aspects of decoding of the decrypted media data, rendering and/or display. |
| D1 | A method of processing first encrypted media data, the method comprising, in a trusted layer of a hardware-protected digital rights management ("DRM") system: determining first metadata that includes key data for decryption of second encrypted media data; and passing the first metadata to an untrusted layer of the hardware-protected DRM system, wherein the first metadata is opaque within the untrusted layer, and wherein second metadata is not opaque within the untrusted layer. |
| D2 | The method of D1 wherein the hardware-protected DRM system includes: for the trusted layer, (a) one or more integrated circuits adapted for decryption and/or decoding, (b) memory storing firmware instructions for controlling the one or more integrated circuits, and (c) protected buffers for storing decrypted media data; and for the untrusted layer, one or more modules of an operating system and/or applications that interact with the trusted layer across one or more interfaces but cannot access the decrypted media data in the protected buffers. |
| D3 | The method of D1 wherein, for the trusted layer, the hardware-protected DRM system uses a general-purpose CPU and memory without special-purpose hardware for decryption, wherein transitions between the trusted layer and the untrusted layer are hardware managed, and wherein only signed firmware instructions can be loaded into the memory and executed in processing for the trusted layer. |
| D4 | The method of D1 wherein the method further comprises: receiving the first metadata from the untrusted layer; decrypting the second encrypted media data using the key data; and decoding the decrypted media data, wherein the second metadata is used to manage at least some aspects of the decoding, rendering and/or display. |
| D5 | The method of D1 wherein the method further comprises: receiving at least some of the source media data from the untrusted layer; determining at least some of the second metadata from the received source media data; and passing the at least some of the second metadata to the untrusted layer. |
| D6 | The method of D5 wherein the second metadata includes at least some slice header parameters for at least some data units. |
| D7 | The method of D1 wherein the second encrypted media data is the first encrypted media data. |
| D8 | The method of D1 wherein the second encrypted media data is a transcrypted version of the first encrypted media data, and wherein the method further comprises, in the trusted layer: receiving the first encrypted media data from the untrusted layer; and transcrypting the first encrypted media data into the second encrypted media data. |
| D9 | The method of D1 wherein the key data is an encrypted version of a key usable to decrypt the second encrypted media data, and wherein the method further comprises, in the trusted layer: decrypting the key. |
| D10 | The method of D1 wherein the key data is a token representing the key usable to decrypt the second encrypted media data, and wherein the method further comprises, in the trusted layer: determining the key using the token. |

In view of the many possible embodiments to which the principles of the disclosed invention may be applied, it should be recognized that the illustrated embodiments are only preferred examples of the invention and should not be

We claim:

1. One or more computer-readable devices or computer-readable memory storing computer-executable instructions for causing a computing system programmed thereby to perform media decoding control comprising, in an untrusted layer of a hardware-protected digital rights management ("DRM") system:
   receiving source media data including first encrypted media data;
   parsing first metadata from the source media data;
   passing at least some of the source media data to a trusted layer of the hardware-protected DRM system;
   receiving second metadata from the trusted layer after determination of the second metadata from the passed source media data in the trusted layer, wherein the second metadata is not opaque within the untrusted layer; and
   with a host decoder in the untrusted layer, using the first and second metadata to manage at least some aspects of decoding, rendering and/or display in the trusted layer, wherein the decoding, the rendering and the display follows decryption in the trusted layer of second encrypted media data based on the first encrypted media.

2. The one or more computer-readable devices or computer-readable memory of claim 1 wherein the hardware-protected DRM system includes:
   for the trusted layer, (a) one or more integrated circuits adapted for decryption and/or decoding, (b) memory storing firmware instructions for controlling the one or more integrated circuits, and (c) protected buffers for storing decrypted media data; and
   for the untrusted layer, one or more modules of an operating system and/or applications that interact with the trusted layer across one or more interfaces but cannot access the decrypted media data in the protected buffers.

3. The one or more computer-readable devices or computer-readable memory of claim 1 wherein the hardware-protected DRM system uses, for the trusted layer, a general-purpose central processing unit and memory without special-purpose hardware for decryption, wherein transitions between the trusted layer and the untrusted layer are hardware-managed, and wherein only signed firmware instructions are loadable into the memory and executable for processing in the trusted layer.

4. The one or more computer-readable media devices or computer-readable memory of claim 1 wherein the first metadata includes one of more of: (a) at least some of a sequence parameter set, (b) at least some of a picture parameter set unit, (c) lengths of data units, (d) types of the data units, (e) at least some slice header parameters for at least some of the data units, (f) other parameters to be used for the decoding, and (g) sub-sample mapping data for the data units, the sub-sample mapping data indicating non-encrypted amounts and encrypted amounts for the respective data units.

5. The one or more computer-readable devices or computer-readable memory of claim 1, wherein
   the second metadata includes at least some slice header parameters for at least some data units.

6. The one or more computer-readable devices or computer-readable memory of claim 1 wherein the second encrypted media data is the first encrypted media data.

7. The one or more computer-readable devices or computer-readable memory of claim 1 wherein the second encrypted media data is a transcrypted version of the first encrypted media data, the transcrypted version having been created in the trusted layer using the first encrypted media data.

8. The one or more computer-readable devices or computer-readable memory of claim 1 wherein the media decoding control further comprises:
   receiving other metadata from the trusted layer, the other metadata including key data for decryption of the second encrypted media data, wherein the other metadata is opaque within the untrusted layer;
   passing the other metadata, including the key data, to the trusted layer for use in the decryption of the second encrypted media data.

9. The one or more computer-readable devices or computer-readable memory of claim 8 wherein the key data is (a) an encrypted version of a key usable to decrypt the second encrypted media data, or (b) a token or handle representing the key usable to decrypt the second encrypted media data.

10. An apparatus comprising memory and one or more integrated circuits adapted for decryption and/or decoding, the memory storing computer-executable instructions for causing the apparatus to perform media decoding control for first encrypted media data, the media decoding control comprising, in a trusted layer of a hardware-protected digital rights management ("DRM") system:
    receiving at least some source media data from an untrusted layer of the hardware-protected DRM system, the at least some source media data including the first encrypted media data, the source media data also including first metadata parsed in the untrusted layer;
    determining second metadata from the received source media data;
    passing the second metadata to the untrusted layer, wherein the first and second metadata are not opaque within the untrusted layer;
    decrypting second encrypted media data using key data, wherein the second encrypted media data is based on the first encrypted media data; and
    decoding the decrypted media data, wherein the first and second metadata are used to manage, from the untrusted layer, at least some aspects of the decoding, rendering and/or display.

11. The apparatus of claim 10 wherein the media decoding control further comprises, in the trusted layer:
    receiving policy data for the first encrypted media data; and
    enforcing the policy data.

12. The apparatus of claim 10 wherein the media decoding control further comprises:
    determining other metadata that includes the key data;
    passing the other metadata to the untrusted layer, wherein the other metadata is opaque within the untrusted layer; and
    receiving the other metadata from the untrusted layer.

13. The apparatus of claim 10 wherein the second metadata includes at least some slice header parameters for at least some data units.

14. The apparatus of claim 10 wherein the second encrypted media data is the first encrypted media data.

15. The apparatus of claim 10 wherein the second encrypted media data is a transcrypted version of the first encrypted media data, and wherein the media decoding control further comprises, in the trusted layer:
receiving the first encrypted media data from the untrusted layer; and
transcrypting the first encrypted media data into the second encrypted media data.

16. The apparatus of claim 10 wherein the key data is an encrypted version of a key usable to decrypt the second encrypted media data, and wherein the media decoding control further comprises, in the trusted layer:
decrypting the key.

17. The apparatus of claim 10 wherein the key data is a token representing a key usable to decrypt the second encrypted media data, and wherein the method media decoding control further comprises, in the trusted layer:
determining the key using the token.

18. In an untrusted layer of a hardware-protected digital rights management ("DRM") system, a method comprising:
at a control module in the untrusted layer, receiving source media data including first encrypted media data;
at the control module, receiving first metadata from a trusted layer of the hardware-protected DRM system, the first metadata including key data for decryption of second encrypted media data, wherein the first metadata is opaque within the untrusted layer;
with the control module, passing (a) the first metadata and (b) second metadata that is not opaque within the untrusted layer to a host decoder in the untrusted layer;
with the host decoder, passing the first metadata, including the key data, to the trusted layer for use in decryption of the second encrypted media data; and
with the host decoder, using the second metadata to manage at least some aspects of decoding of the decrypted media data, rendering and/or display.

19. The method of claim 18 wherein the second encrypted media data is (a) the first encrypted media data, or (b) a transcrypted version the first encrypted media data, the transcrypted version having been created in the trusted layer using the first encrypted media data.

20. A hardware-protected digital rights management ("DRM") system comprising a trusted layer and an untrusted layer, the hardware-protected DRM system including:
for the trusted layer, (a) one or more integrated circuits adapted for decryption and/or decoding, (b) memory storing firmware instructions for controlling the one or more integrated circuits, and (c) protected buffers for storing decrypted media data; and
for the untrusted layer, one or more modules of an operating system and/or applications that interact with the trusted layer across one or more interfaces but cannot access the decrypted media data in the protected buffers, the one or more modules including a control module and a host decoder;
wherein the hardware-protected DRM system is configured to perform media decoding control comprising, in the untrusted layer:
with the control module, receiving source media data including first encrypted media data;
with the control module, processing metadata about the media data, wherein the metadata is not opaque within the untrusted layer; and
with the host decoder, using the metadata to manage at least some aspects of decoding, rendering and/or display in the trusted layer, wherein the decoding, the rendering and the display follows decryption in the trusted layer of second encrypted media data based on the first encrypted media.

21. The apparatus of claim 20, wherein the media decoding control further comprises, in the untrusted layer:
with the control module, passing at least some of the source media data to the trusted layer; and
at the control module, receiving at least some of the metadata from the trusted layer, the at least some of the metadata received from the trusted layer including at least some slice header parameters for at least some data units.

22. The apparatus of claim 20 wherein the second encrypted media data is a transcrypted version of the first encrypted media data, the transcrypted version having been created in the trusted layer using the first encrypted media data.

23. The apparatus of claim 20 wherein the media decoding control further comprises, in the untrusted layer:
at the control module, receiving other metadata from the trusted layer, the other metadata including key data for decryption of the second encrypted media data, wherein the other metadata is opaque within the untrusted layer; and
passing the other metadata, including the key data, to the trusted layer for use in the decryption of the second encrypted media data.

24. In an untrusted layer of a hardware-protected digital rights management ("DRM") system, a method comprising:
receiving source media data including first encrypted media data;
processing metadata about the media data, wherein the metadata is not opaque within the untrusted layer; and
with a host decoder in the untrusted layer, using the metadata to manage at least some aspects of decoding, rendering and/or display in a trusted layer of the hardware-protected DRM system, wherein the decoding, the rendering and the display follows decryption in the trusted layer of second encrypted media data based on the first encrypted media, wherein the hardware-protected DRM system uses, for the trusted layer, a general-purpose central processing unit and memory without special-purpose hardware for decryption, wherein transitions between the trusted layer and the untrusted layer are hardware-managed, and wherein only signed firmware instructions are loadable into the memory and executable for processing in the trusted layer.

25. The method of claim 24, further comprising, in the untrusted layer:
passing at least some of the source media data to the trusted layer; and
receiving at least some of the metadata from the trusted layer, the at least some of the metadata received from the trusted layer including at least some slice header parameters for at least some data units.

26. The method of claim 24 wherein the second encrypted media data is a transcrypted version of the first encrypted media data, the transcrypted version having been created in the trusted layer using the first encrypted media data.

27. The method of claim 24 further comprising, in the untrusted layer:
receiving other metadata from the trusted layer, the other metadata including key data for decryption of the second encrypted media data, wherein the other metadata is opaque within the untrusted layer;
passing the other metadata, including the key data, to the trusted layer for use in the decryption of the second encrypted media data.

* * * * *